United States Patent [19]

Matsuda et al.

[11] Patent Number: 5,046,822
[45] Date of Patent: Sep. 10, 1991

[54] LIQUID CRYSTAL DEVICE

[75] Inventors: Hiroshi Matsuda, Isehara; Hisaaki Kawade, Atsugi; Yuko Morikawa, Kawasaki; Toshiharu Uchimi, Atsugi; Ken Eguchi; Haruki Kawada, both of Yokohama, all of Japan

[73] Assignee: Canon Kabushiki Kaisha, Tokyo, Japan

[21] Appl. No.: 575,802

[22] Filed: Aug. 31, 1990

[30] Foreign Application Priority Data

Sep. 1, 1989 [JP] Japan .................. 1-226631
Sep. 26, 1989 [JP] Japan .................. 1-251218

[51] Int. Cl.⁵ .................. G02F 1/133; G02F 1/137
[52] U.S. Cl. .................. 359/75; 428/1; 428/473.5; 359/100; 359/900
[58] Field of Search .................. 350/340, 341, 320; 428/1, 473.5

[56] References Cited

U.S. PATENT DOCUMENTS 4,781,439  11/1988  Yokokura et al. .................. 350/341

FOREIGN PATENT DOCUMENTS 0365855  9/1989  European Pat. Off. .

Primary Examiner—Alexander S. Thomas
Attorney, Agent, or Firm—Fitzpatrick, Cella, Harper & Scinto

[57] ABSTRACT

The present invention provides a liquid crystal material disposed between said pair of substrates, wherein at least one of said substrates is provided with a film comprising a polyimide compound having in its polyimide main-chain structural unit at least one alkyl side chain containing an alkyl chain moiety having a length of 2 to 10 carbon atoms.

17 Claims, 11 Drawing Sheets

APPLICATION OF PULSE ELECTRIC FIELD

DIRECTION OF ELECTRIC FIELD

ATTENUATION OF Vrev

LIQUID CRYSTAL DEVICE

BACKGROUND OF THE INVENTION

1. Field of the Invention

The present invention relates to a ferroelectric liquid crystal device, for use in a liquid crystal display or a liquid crystal optical shutter. More particularly, the present invention is concerned with a liquid crystal device having improved display characteristics because of an improvement of the state of liquid crystal molecular alignment.

2. Related Background Art

Clark and Lagerwall have proposed a display device which uses the refractive index anisotropy of ferroelectric liquid crystal molecules and controls light ray transmission by combination with a polarizer (see Japanese Patent Laid-Open Application No. 56-107216 and U.S. Pat. No. 4,367,924). This ferroelectric liquid crystal commonly has a chiral smectic C phase (Sm*C) or H phase (Sm*H) of non-spiral structure in a specific temperature range and when under such state, assumes either a first or a second optically stable state in response to an applied electric field. The liquid crystal also maintains that state when no electric field is applied, in other words, the liquid crystal is bistable. This ferroelectric liquid crystal also has a quick response to changes in electric fields, and is expected to be utilized in a high-speed memory type display device. In particular, in view of its function, it is expected to be useful for a high resolution large screen display device.

In order for an optical modulation device applying such a bistable liquid crystal to exhibit desired drive characteristics, a liquid crystal disposed between a pair of parallel substrates must be in the state of molecular orientation such that conversion between the two stable states may effectively occur, independently of an applied state of electric field.

In the case of a liquid crystal device in which the double refraction of a liquid crystal is utilized, the transmittance under crossed nicols is expressed by:

$$I/I_0 = \sin^2 4\theta \sin^2 \frac{\Delta nd}{\lambda} \pi$$

wherein
- $I_0$: incident light intensity,
- $I$: transmitted light intensity,
- $\theta$: tilt angle
- $\Delta n$: refractive index anisotropy
- $d$: film thickness of a liquid crystal layer,
- $\lambda$: wavelength of incident light.

Thus, the tilt angle $\theta$ in the above non-spiral structure is present as an angle in the direction of an average molecular axis of a liquid crystal molecule twistingly oriented in the first and second states of alignment. According to the above expression, the transmittance reaches a maximum when the tilt angle $\theta$ is an angle of 22.5°, and hence a tilt angle $\theta$ in the non-spiral structure realizes the bistable state is required to be as near as possible to 22°.

It is desirable, for instance, to use a method by which a molecular layer formed of a plurality of molecules that form a smectic liquid crystal can be monoaxially aligned along its normal using a manufacturing process which can be carried out simply. The method as disclosed, for example, in U.S. Pat. No. 4,561,726 is known as a method of aligning a ferroelectric liquid crystal, in particular, a chiral smectic liquid crystal of non-spiral structure.

However, in instances in which alignment methods hitherto used, in particular, those methods using a polyimide film subjected to rubbing, the following problems occur.

Experiments made by the present inventors revealed that a tilt angle $\theta$ (the angle shown in FIG. 3 described later) in a ferroelectric liquid crystal of non-spiral structure obtained using a conventional rubbing polyimide alignment film becomes smaller than a tilt angle (the angle $\theta$ of ½ of a vertical angle of a trigonal pyramid shown in FIG. 2 described later) in a ferroelectric liquid crystal of spiral structure. In particular, the tilt angle $\theta$ was approximately 3° to 8° in general, and the transmittance at that time was approximately 3 to 5% at best.

Thus, according to Clark and Lagerwall, the tilt angle in a bistable ferroelectric liquid crystal should be the same angle as the tilt angle in a spiral ferroelectric liquid crystal. In practice, however, the tilt angle $\theta$ is smaller than the tilt angle $\theta$ due to the twisted orientation of liquid crystal molecules in the non-spiral structure. More specifically, in the non-spiral ferroelectric liquid crystal, liquid crystal molecules are twistingly oriented in a continuous form at a twist angle $\delta$, which is twisted from an axis of a liquid crystal molecule adjacent to an upper substrate toward en axis of a liquid crystal molecule adjacent to a lower substrate (i.e., in the direction of twisted orientation), with respect to the normal of each substrate. This is the reason why the tilt angle $\theta$ in the non-spiral structure becomes smaller than the tilt angle $\theta$ in the spiral structure.

In the instance where a chiral smectic liquid crystal is aligned using a conventional rubbed polyimide film, the polyimide alignment film is an insulating layer between an electrode and a liquid crystal layer. Hence, when a voltage with one polarity is applied so that the first optical stable state (for example, a white display) is switched to the second optical stable state (for example, a black display), a reverse electric field $V_{rev}$ with the other polarity is produced in the ferroelectric liquid crystal layer after removal of the application of this voltage with one polarity, often causing an after-image at the time of display. The above phenomenon of producing a reverse electric field is discussed in Yoshida Akio, "Switching Characteristics of SSFLC", A Collection of Drafts for Liquid Crystal Forum, p. 142–143, October, 1987.

SUMMARY OF THE INVENTION

Accordingly, an object of the present invention is to provide a liquid crystal device that has solved the above problems, in particular, to provide a ferroelectric liquid crystal device having a large tilt angle $\theta$ in the non-spiral structure of a chiral smectic liquid crystal, enables high contrast image display, and achieves display without after-image.

A first embodiment of the present invention is characterized by a liquid crystal device comprising a pair of substrates having a liquid crystal material disposed between said pair of substrates, wherein at least one of said substrates is provided with a film comprising a polyimide compound having in its polyimide main-chain structural unit at least one alkyl side chain containing an alkyl chain moiety having a length of 2 to 10 carbon atoms. The alkyl chain is preferably a straight chain.

A second embodiment of the present invention is characterized by a liquid crystal device comprising a pair of substrates and a liquid crystal material disposed between said pair of substrates, wherein at least one of said substrates is provided with a laminated film comprised of a film comprising a polyimide containing a structural unit represented by the following Formula (I) and a film comprising a polyimide containing a structural unit represented by the following Formula (II).

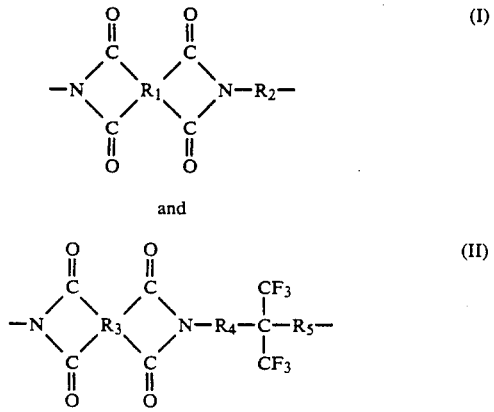

In the above Formulas (I) and (II), $R_1$ represents a benzene group, a diphenyl group, a naphthalene group, a diphenylmethane group, a diphenyl sulfide group, a diphenyl ether group, or a derivative group thereof on which at least one methyl group or ethyl group is substituted; $R_2$ represents a benzene group, a diphenyl group, a naphthalene group, a benzene sulfide group, a diphenyl sulfone group, a diphenyl ether group, a phenoxyphenyl group, or a derivative group thereof on which at least one methyl group or ethyl group is substituted; $R_3$ represents the same as defined for $R_1$, a derivative group thereof on which at least one trifluoromethane group is substituted, or a 2,2-bisphenylhexafluoropropane group or a derivative group thereof on which at least one trifluoromethane group is substituted; $R_4$ and $R_5$ may be the same or different, and each represent the same as defined for $R_2$ or a derivative group thereof on which at least one trifluoromethane group is substituted, and 2,2-bisphenylhexafluoropropane group or a derivative thereof on which at least one trifluoromethane group is substituted.

DETAILED DESCRIPTION OF THE PREFERRED EMBODIMENTS

Figure 1:
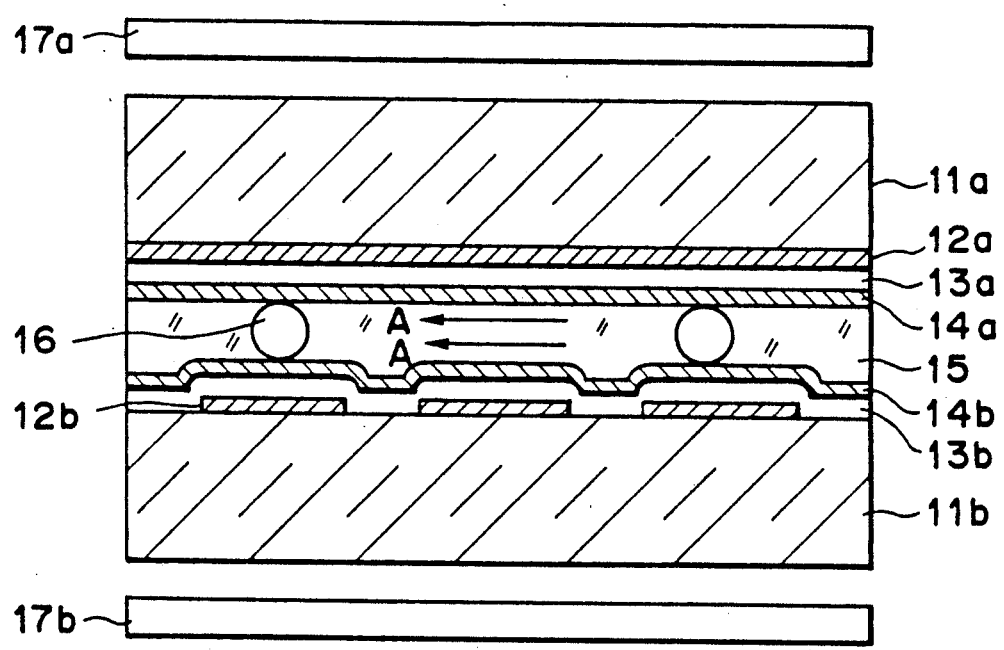
FIG. 1 is a cross-sectional illustration of a liquid crystal device according to the present invention.

FIG. 1 diagramatically illustrates a ferroelectric liquid crystal cell according to the present invention.

The numerals 11a and 11b denote substrates (glass plates) covered with transparent electrodes 12a and 12b made of $In_2O_3$ or ITO (indium-tin oxide), respectively. Insulating films 13a and 13b ($SiO_2$ films, $TiO_2$ films, $Ta_2O_5$ films or the like) and alignment control films 14a and 14b formed using the polyimide of the present invention are laminated thereon, respectively. A liquid crystal 15 is disposed between the substrates 11a and 11b. The distance between the substrates 11a and 11b is set to be a distance (for example, 0.1 μm to 3 μm) small enough to control the formation of a spiral structure in the case when the liquid crystal 15 is a ferroelectric smectic liquid crystal. In that case, the alignment of the liquid crystal 15 has a bistability. The above distance small enough is retained using a beads spacer 16 (e.g., silica beads, alumina beads) disposed between the substrates 11a and 11b.

The first embodiment of the present invention will be described below.

Polyimide films used in the present invention as the above alignment control films 14a and 14b can be obtained by forming a polyamide acid, synthesized by condensation reaction of a carboxylic anhydride with a diamine, into films by coating or the LB process, followed by imidation.

An alkyl-substituted carboxylic anhydride and a diamine which are used in the present invention include, for example, the following:

Diamines

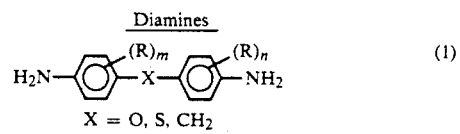

$X = O, S, CH_2$

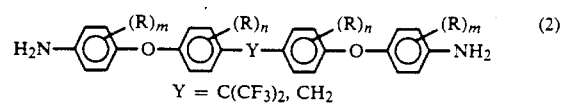

$Y = C(CF_3)_2, CH_2$

Carboxylic anhydrides

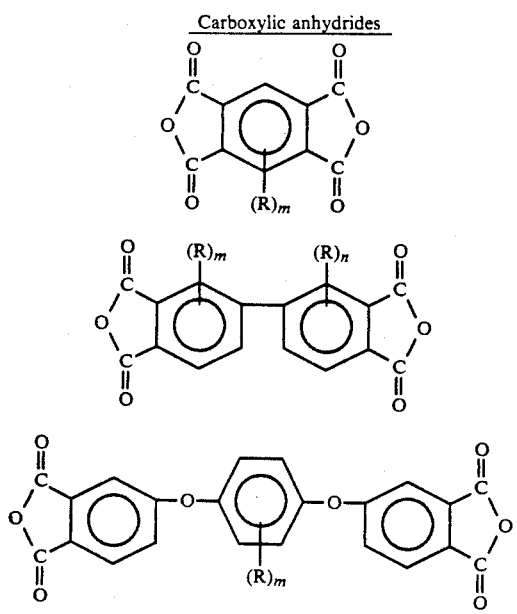

In the foregoing, m and n each represent an integer of 0 to 3; R is selected from the group consisting of: normal—$C_lH_{2l+1}$—, l=an integer of 2 to 10; normal—$C_lH_{2l+1}CO$—, l=an integer of 2 to 10; normal—$C_lH_{2l+1}O$—, l=an integer of 2 to 10; normal—$CF_3(CF_2)_k(CH_2)_l$—, l+k=an integer of 2 to 10 and k=2, 3 or 5; normal—$CF_3(CF_2)_k(CH_2)_lCO$—, l+k=an integer of 2 to 10 and k=2, 3 or 5; $(CF_3)_2CF(CH_2)_l$, l=an integer of 0, 1 to 8; or $(CF_3)_2CF(CH_2)_lCO$—, l=an integer of 0, 1 to 8. And R can be combined with different two or more kinds of the group above.

In the present invention, it is possible to use two or more kinds of the above R-substituted diamine and/or two o more kinds of the carboxylic acid anhydride. Alternatively, it is also possible to use a polyamide acid synthesised by condensation reaction of the above R-substituted diamine or carboxylic anhydride with a conventionally known carboxylic anhydride or unsubstituted diamine. These can be used in the form of a copolymer comprised of various combinations.

The polyimide film used in the present invention can be provide on a substrate in the following method: First, the polyamide acid, which is a precursor of a polyimide, and a long-chain alkylamine are mixed in a solvent such as dimehtylformamide, dimethylacetamide, dimethyl sulfoxide or N-methylpyrrolidone, in a molar ratio of 1:2 to form a 0.1 to 1.0 mM solution (monomer units). The resulting solution is spread on an interface between air and water, and a film is built up on the substrate by a conventionally known LB process. Thereafter, the built-up film is heated to a temperature of from 100 to 350° C., and preferably from 200 to 300° C., to effect dehydration, cyclization and removal of amines. A polyimide film can be thus formed. This LB polyimide film can obtain uniform monoaxial aligning properties without rubbing treatment, and thus the LB process is suitable as a method of forming an alignment film.

For the purpose of achieving the object of the present invention, the film formation method is by no means limited to the above LB process. A film formed by conventionally known spin coating, spray coating or roll coating, which is then subjected to rubbing treatment using a cloth or the like, can also exhibit a superior performance as an alignment film. The rubbing may preferably be carried out in the direction A as shown in FIG. 1 so as to be in the same directions for the upper and lower substrates.

The polyimide film used in the first embodiment of the present invention may be formed to have a film thickness of from about 10 Å to about 1 μm, preferably from 30 Å to 2,000 Å, and more preferably from 30 Å to 300 Å.

Use of the insulating films 13a and 13b shown in FIG. 1 may be omitted. In the present invention, in the case when the polyimide films are provided on the insulating films 13a and 13b (each preferably having a film thickness of from 200 Å to 1,000 Å), such polyimide aligning films may be formed to each have a film thickness of not more than 200 Å, and preferably not more than 100 Å.

As the second embodiment of the present invention, the above alignment control films 14a and 14b may each be formed of a laminated film comprised of films comprising a polyimide containing a structural unit represented by the above Formula (I) and a polyimide containing a structural unit represented by the above Formula (II), respectively. These polyimide films can be obtained by subjecting a polyamide acid synthesized by condensation reaction of a carboxylic anhydride with a diamine, to imidation.

In the case of the polyimide containing the structure of Formula (I), the carboxylic acid anhydride used in the present invention includes, for example, pyromellitic anhydride, 2,3,6,7-naphthalenetetracarboxylic anhydride, 3,3',4,4'-diphenyltetracarboxylic anhydride, 1,2,5,6-naphthalenetetracarboxylic anhydride, 2,2',3,3'-diphenyltetracarboxylic anhydride, thiophene-2,3,4,5-tetracarboxylic anhydride, 3,3',4,4'-diphenyl propane-tetracarboxylic anhydride, 3,3',4,4'-diphenylsulfonetetracarboxylic anhydride, 3,3'4,4'-diphenylethertetracarboxylic anhydride, 3,3',4,4'-diphenylsulfidetetracarboxylic anhydride, (hereinafter called "Group A"), and also includes derivatives of any of the compounds of Group A on which at least one methyl group or ethyl group is substituted (hereinafter called "Group B"). In the case of the polyimide containing the structure of Formula (II), the carboxylic anhydride includes, in addition to those shown as Group A and Group B, 1,1,1,3,3,3-hexafluoro-2,2-bis(3,4-phenyldicarboxylic anhydride)propane, and derivatives of any of the compounds of Groups A and B or the above 1,1,1,3,3,3-hexafluoro-2,2-bis(3,4-phenyldicarboxylic anhydride)propane, on which at least one trifluoromethyl group is substituted.

As for the diamine also used in the present invention, it includes, for example, in the case of the polyimide containing the structure of Formula (I), m-phenylene diamine, p-phenylene diamine, m-xylene diamine, p-xylene diamine, 4,4'-diaminodiphenyl ether, 4,4'-diaminodiphenyl methane, 2,2'-bis(4-aminophenyl)propane, 4,4'-methylenedianiline, 4,4'-diaminodiphenyl sulfide, 4,4'-diaminodiphenylsulfonic acid, 1,5-diaminonaphthalene, and 3,3'-dimethylbenzidine (hereinafter called "Group C"), and also includes derivatives of any of the compounds of Group C on which at least one methyl group or ethyl group is substituted. In the case of the polyimide containing the structure of Formula (II), the diamine includes, for example, 2,2-bis[4-(4-aminophenoxy)phenyl]hexafluoropropane, 2,2-bis[4-(3-aminophenoxy)phenyl]hexafluoropropane, 2,2-bis[4-(2-aminophenoxy) phenyl]hexafluoropropane, 2,2-bis(4- aminophenyl)hexafluoropropane, 2,2-bis[4-(4-aminophenyl sulfide)phenyl]hexafluoropropane, 2,2-bis[4-(4-aminobenzyl)phenyl]hexafluoropropane, 2,2-bis[4-(4-aminophenylsulfonic acid)phenyl]hexafluoropropane, and 2,2-bis(5-aminonaphthyl)hexafluoropropane (hereinafter called "Group D"), and also includes derivatives of any of the compounds of Group D on which at least one methyl group, ethyl group and/or trifluoromethyl group is or are substituted. Since the polyimide used in the present invention may only partially contain the above structural unit in its polymer main chain, it is also possible to utilize a copolymer polyimide comprised of two or more kinds of carboxylic anhydrides and/or two or more kinds of diamines.

Figure 12A:
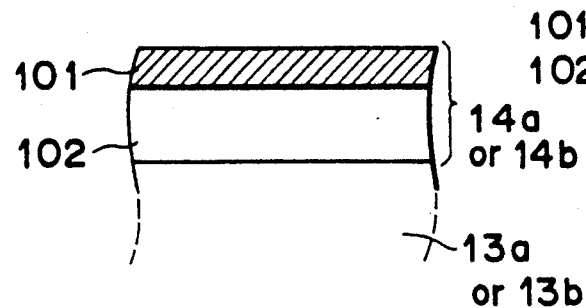
FIGS. 12A and 12B each illustrates the constitution of a polyimide liquid crystal alignment film of the present invention.
Figure 12B:
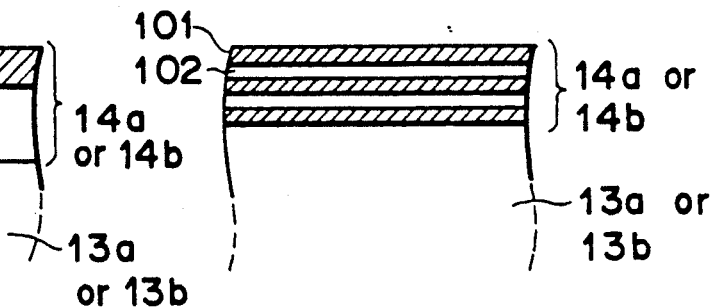

A method of building up on a substrate the polyimide alignment layer used in the second embodiment of the present invention will be described below. The polyimide alignment layer of the present invention can be formed by laminating the polyimide film containing the structure represented by Formula (I) (hereinafter called "polyimide film A") and the polyimide film containing the structure represented by Formula (II) (hereinafter called "polyimide film B") as previously described. FIG. 12 illustrates its constitution. Such alignment layer constitution can be roughly grouped into an instance in which a polyimide film B 101 is provided on a polyimide film A (FIG. 12A) and an instance in which these are alternately laminated (FIG. 12B). In the alignment film of the present invention, at least an outermost polyimide layer is required to be formed by the Langmuir-Brodgett process (herein after called "LB process"). In respect of a lower polyimide layer than the outermost layer, it may be formed either by coating methods hitherto widely used or by the LB process. More specifically, in the case when an alignment film having the constitution as shown in FIG. 12A is prepared, the following instances are possible: (i) an instance in which the polyimide film A is formed by coating and the polyimide film B is formed by the LB process, (ii) an instance in which the polyimide film A and part of the polyimide film B (on the side contiguous to the polyimide film A) are formed by coating, and only its upper, outermost polyimide film B is formed by the LB process, and (iii) all polyimide films are formed by the LB process. In the case when aligning films are formed to have the constitution as shown in FIG. 12B, it is preferred to form all the polyimide layers by the LB process. The LB process is a process of making a monomolecular film or a built-up film thereof by utilizing the mechanism that when the hydrophilic part and hydrophobic part are appropriately balanced (i.e. amphipatic balance) in a structure having the both parts in the molecule, the molecule forms a monomolecular layer on a water surface with its hydrophilic group downward, where the monomolecular layer thus formed is transferred to a substrate. Hence, using such an LB process, an organic ultra-thin film having a film thickness controlled in a molecule length order can be provided in a uniform, homogeneous and stable state over a large area.

In order to form the polyimide alignment film of the present invention by the use of the above LB process, a precursor polyamide acid is spread over a water surface. At this time, the hydrophobic part and hydrophilic part must be introduced into the molecule as described above. This can be achieved by mixing a long-chain alkylamine to form an amine salt on a carboxyl group of the polyamide acid. More specifically, quaternizing the nitrogen of a long-chain alkylamine brings about the introduction of the hydrophilic part, and a long-chain alkyl moiety is attributable to the introduction of the hydrophobic part. The long-chain alkyl amine that can be used includes primary amines such as n-hexadecylamine, n-octadecylamine and n-docosylamine, secondary amines such as di-n-decylamine, di-n-dodecylamine and di-n-tetradecylamine, and tertiary amines such as N,N-dimethyl-n-hexadecylamine, N,N-dimethyl-n-octadcylamine, N-methyl-di-n-decylamine, N-methyl-di-n-dodecylamine, N-methyl-di-n-tetradecylamine, tri-n-nonylamine, tri-n-decylamine and tri-n-dodecylamine. These may be mixed in such a ratio that may form all carboxyl groups of the polyamide acid into amine salts. More specifically, there are usually two carboxyl groups per repeating unit of a polyamide acid, and in such an instance the molar ratio of repeating units of the polyamide acid to an amine may preferably be 1:2 to 1:3, and more preferably from 1:2 to 1:2.5. As a solvent used here, N,N-dimethylacetamide is preferred, but any solvents may be used so long as they can well dissolve the polyamide acid and make the resulting solution to be readily spread over a water surface. There are no particular limitations on the concentration of the polyamide acid. From the viewpoint of spreadability, it may preferably be in a concentration ranging from $1 \times 10^{-7}$ to $1 \times 10^{-5}$ M for the repeating unit of a polyamide acid. A polyamide acid amine salt solution prepared in this way is gently spread over an aqueous phase. Here, pure water of 5 to 20° C. is commonly used as the aqueous phase. Its pH may be adjusted by adding every sort of metal ions or adding an alkali. Next, the polyamide acid amine salt thus spread over the water surface is compressed to form a monomolecular film of the polyamide acid amine salt. The surface pressure for this compression depends on the types of the polyamide or acid amine salt used. It may be approximately in the range of from 5 to 35 mN/m. To the monomolecular film on the water surface, thus prepared, the liquid crystal cell substrate previously described may be immersed and then drawn up in the direction crossing the monomolecular film on the water surface while the surface pressure is kept constant, so that two layers of monomolecular films can be built up on the substrate. The rate at which the substrate is immersed and drawn up here depends on the types of the polyamide acid amine salt. It may be approximately from 3 to 50 mm/min. Such an operation may be repeated, whereby a built-up film of monomolecular films comprising the polyamide acid amine salt can be obtained in the desired layers. In order to obtain the alternately laminated film as shown in FIG. 12B, the monomolecular film on the water surface is removed for each step of immersing and drawing-up when the formation of a film on the substrate is completed, and another monomolecular film may be formed afresh so that film formation can be further carried out. This operation may be repeated. In order to obtain a single layer film, two methods can be used. One of them is a method in which a substrate is previously kept immersed in an aqueous phase, thereafter a monomolecular film is formed on a water surface, and this monomolecular film is transferred to the substrate through a drawing-up step. The other of them is a method in which a monomolecular film is formed on the water surface, then a substrate is immersed in it so that the monomolecular film is transferred to the substrate, thereafter the monomolecular film on the water surface is removed, and the substrate on which a single layer film has been formed is drawn up. From the viewpoint of the stability of the film transferred to the substrate, it is desirable to use the former method.

The monomolecular film or a built-up film of monomolecular films comprising the polyamide acid amine salt, formed on the substrate in this way, may be heated to carry out a dehydration and cyclization (imidization) reaction and an deamination reaction. The desired polyimide film can be thus obtained. Baking, carried out here, should preferably be carried out at 150° C. to 300° C. 10 to 60 minutes in approximation, and in a nitrogen atmosphere or under reduced pressure. In either constitution of FIGS. 12A and 12B, the polyamide film formed by the LB process may preferably be formed in a layer number within the range of from 1 to 10, and in a film thickness of from 8 to 400 Å in total (each layer has a film thickness of approximately from 4 to 80 Å, though depending on the type of the polyimide). In regard to the direction in which the substrate is drawn up, the films should preferably be so formed as to be in the same direction (for example, the direction A shown in FIG. 1) between the upper and lower substrates when a cell has been made up.

As previously described, in the lower layer of the polyimide monomolecular film or the built-up film of polyimide monomolecular films, coating methods hitherto widely used may be used to form a polyimide film. In order to provide such a polyimide film on the substrate, a polyamide acid, which is a precursor of the polyimide, may be dissolved in a solvent such as N,N-dimethylformamide, N,N-dimethylacetamide, N,N-dimethyl sulfoxide or N-methylpyrrolidone to form a 0.01 to 40 wt. % solution, and the resulting solution may be coated on a substrate by spin coating, spray coating or roll coating, followed by heating at a temperature of from 100 to 350° C., and preferably from 200 to 300° C., to carry out dehydration and cyclization(imidation). The desired polyimide film can be thus formed. The polyimide film formed by such coating methods may preferably have a film thickness of from about 30 Å to about 2,000 Å, and more preferably from 200 Å to 1,000 Å. Use of the insulating layers 13a and 13b as shown in FIG. 1 can be omitted.

Liquid crystal materials used in the present invention may preferably be liquid crystals that produce a chiral smectic phase through an isotropic phase, a cholesteric phase, and a smectic A phase in the temperature-decreasing process. Particularly preferred is a liquid crystal with a pitch of not less than 0.8 μm when it is in a cholesteric phase (the pitch in e cholesteric phase is measured at the middle in the temperature range of the cholesteric phase). Preferably usable as a specific liquid crystal is a liquid crystal composition containing the following liquid crystal materials "LC-1", "80B" and "80SI*" in the following percentage.

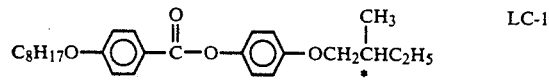

LC-1

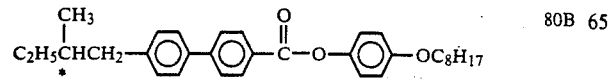

80B

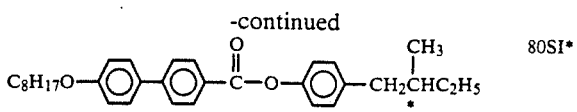

80SI*

Liquid crystal Composition (1) (LC-1)$_{90}$/(80B)$_{10}$
(2) (LC-1)$_{80}$/(80B)$_{20}$
(3) (LC-1)$_{70}$/(80B)$_{30}$
(4) (LC-1)$_{60}$/(80B)$_{40}$
(5) 80SI*

(In the table, the subscript numerals are each expressed in weight ratio.)

Figure 2:
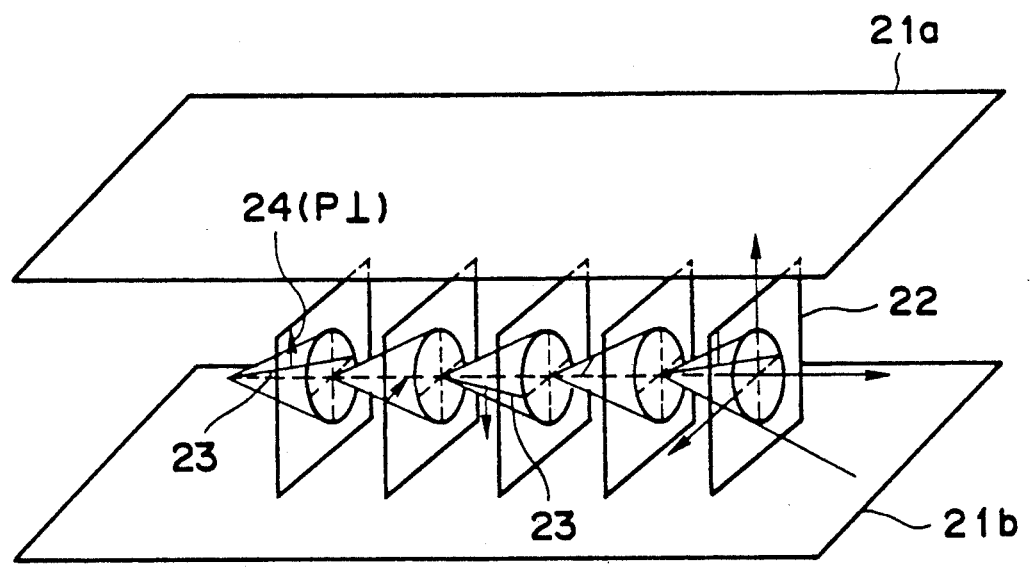
FIG. 2 is a perspective illustration of a state of alignment of a chiral smectic liquid crystal of spiral structure.

FIG. 2 is a diagramatical drawing of an example of a cell, to illustrate the operation of a ferroelectric liquid crystal. The numerals 21a and 21b each denotes a substrate (a glass plate) covered with a transparent electrode comprised of a thin film made of $In_2O_2$, $SnO_2$, ITO or the like. Between the substrates, a liquid crystal of an SmC* (chiral smectic C) phase or an SmH* (chiral smectic H) phase is sealed, which is so aligned that its liquid crystal molecular layer 22 may be perpendicular to the glass surfaces. A line 23 shown by a thick line indicates a liquid crystal molecule. This liquid crystal molecule 23 has a dipole moment (P⊥) 24 in the direction falling at right angles with its molecule. When a voltage higher than a given threshold value is applied between the electrodes provided on the substrates 21a and 21b, the spiral structure of the liquid crystal molecule 23 comes loose, and thus the liquid crystal molecule 23 can change its direction of alignment so that all of dipole moments (P⊥) 24 face toward the direction of the electric field. The liquid crystal molecule 23 has a slender shape, and shows refractive index anisotropy between its direction of the longitudinal axis and direction of the lateral axis. Hence, it can be easily understood that if, for example, polarizers which are in crossed nicols each other are placed on both sides of a glass surface, there can be provided a liquid crystal optical modulation device capable of changing optical characteristics depending on the polarity of the applied voltage.

Figure 3:
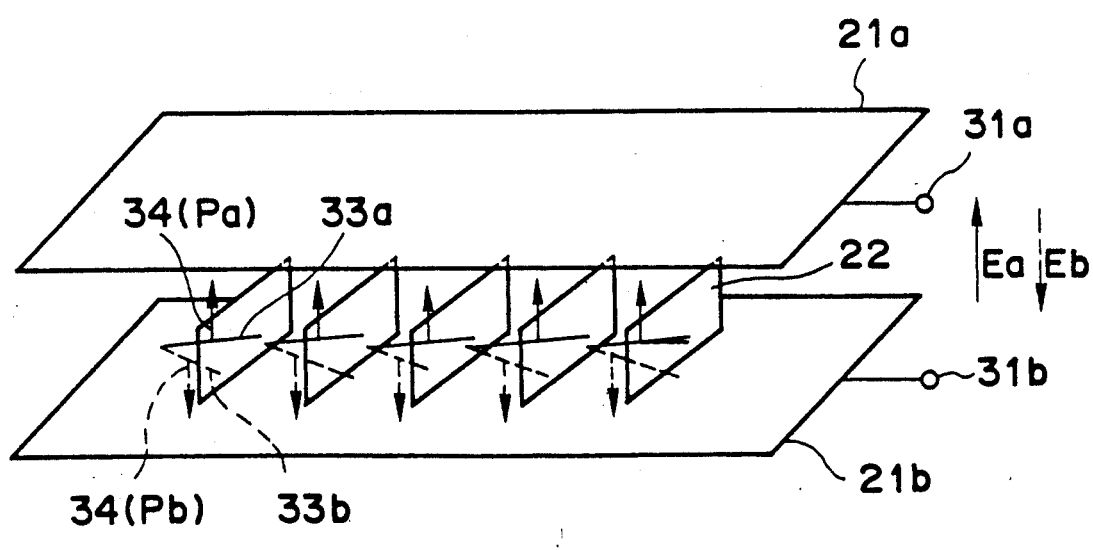
FIG. 3 is perspective illustration of a state of alignment of a chiral smectic liquid crystal of non-spiral structure.

A surface stabilized ferroelectric liquid crystal cell in the state of bistable alignment, which is used in the liquid crystal device of the present invention, can be made to have a sufficiently small thickness, for example, of from 0.1 μm to 3 μm. As the thickness of a liquid crystal layer becomes smaller in this way, the spiral structure of a liquid crystal molecule comes loose even in the state where no electric field is applied, and turns to have a non-spiral structure, so that its dipole moment P or P' results in either an upward state (34a) or a downward state (34b), as shown in FIG. 3. When as shown in FIG. 3 an electric field Ea or Eb of a voltage higher than a given threshold value and having a different polarity is applied to such a cell through means of applying a voltage (31a) and (31b), the dipole moment changes its direction to an upward direction 34a or a downward direction 34b corresponding to the electric field vector of the electric field Ea or Eb, and, correspondingly therewith, the liquid crystal molecule is aligned in the direction of either a first stable state 33a or a second stable state 33b.

The effects obtainable from this ferroelectric liquid crystal cell are firstly that the response. speed is very high, and secondly that the alignment of the liquid crystal molecule is bistable. The second effect will be further described with reference to, for example, FIG. 3. When the electric field Ea is applied, the liquid crystal molecule is aligned in the first stable state 33a and this state is stable even when the electric field has been removed. On the other hand, when the electric field Eb of a reverse direction is applied, the liquid crystal molecule is aligned in the second stable state 33b to change their direction, and still remain in this state even when the electric field has been removed. The respective states of alignment are also maintained so long as the electric field Ea to be applied does not exceed a given threshold value.

Figure 4A:
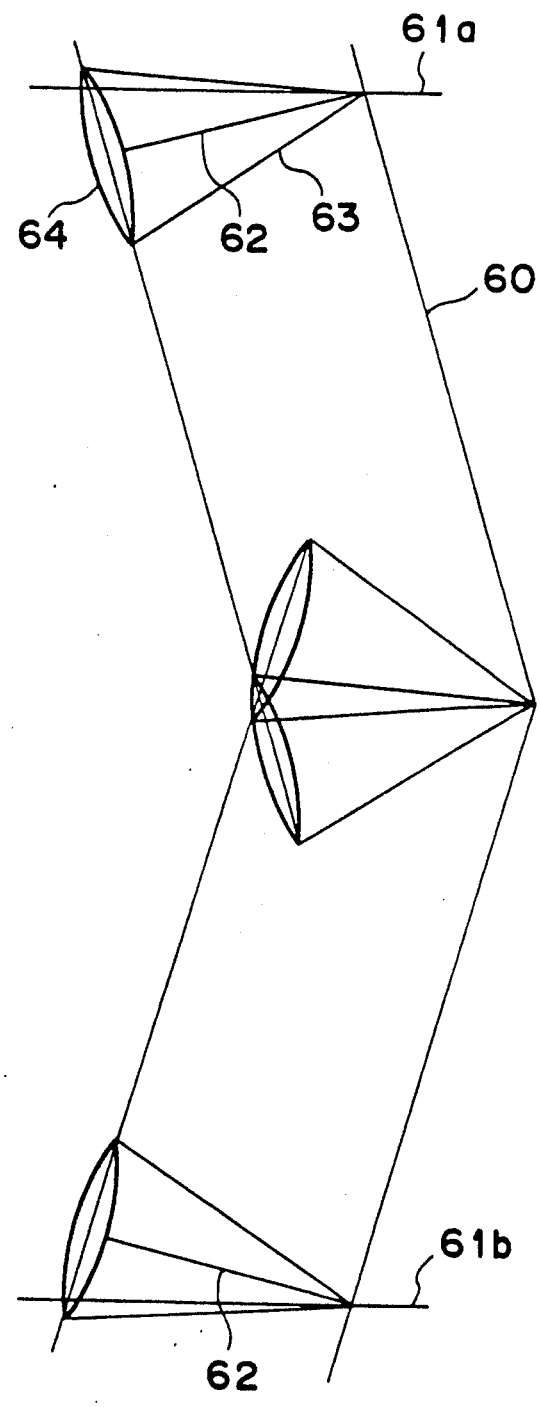
FIG. 4A is a cross-sectional illustration of a state of alignment of a chiral smectic liquid crystal aligned according to an aligning method of the present invention.

FIG. 4A is a cross-sectional view to diagramatically explain the state of alignment of liquid crystal molecules as produced in the direction of alignment according to the present invention.

The numerals 61a and 61b shown in FIG. 4A denote an upper substrate and a lower substrate, respectively. The numeral 60 denotes a molecular layer formed of liquid crystal molecules 62, and the liquid crystal molecules 62 are arranged with changes in their positions along the base 64 (circular) of a cone 63.

Figure 4B:
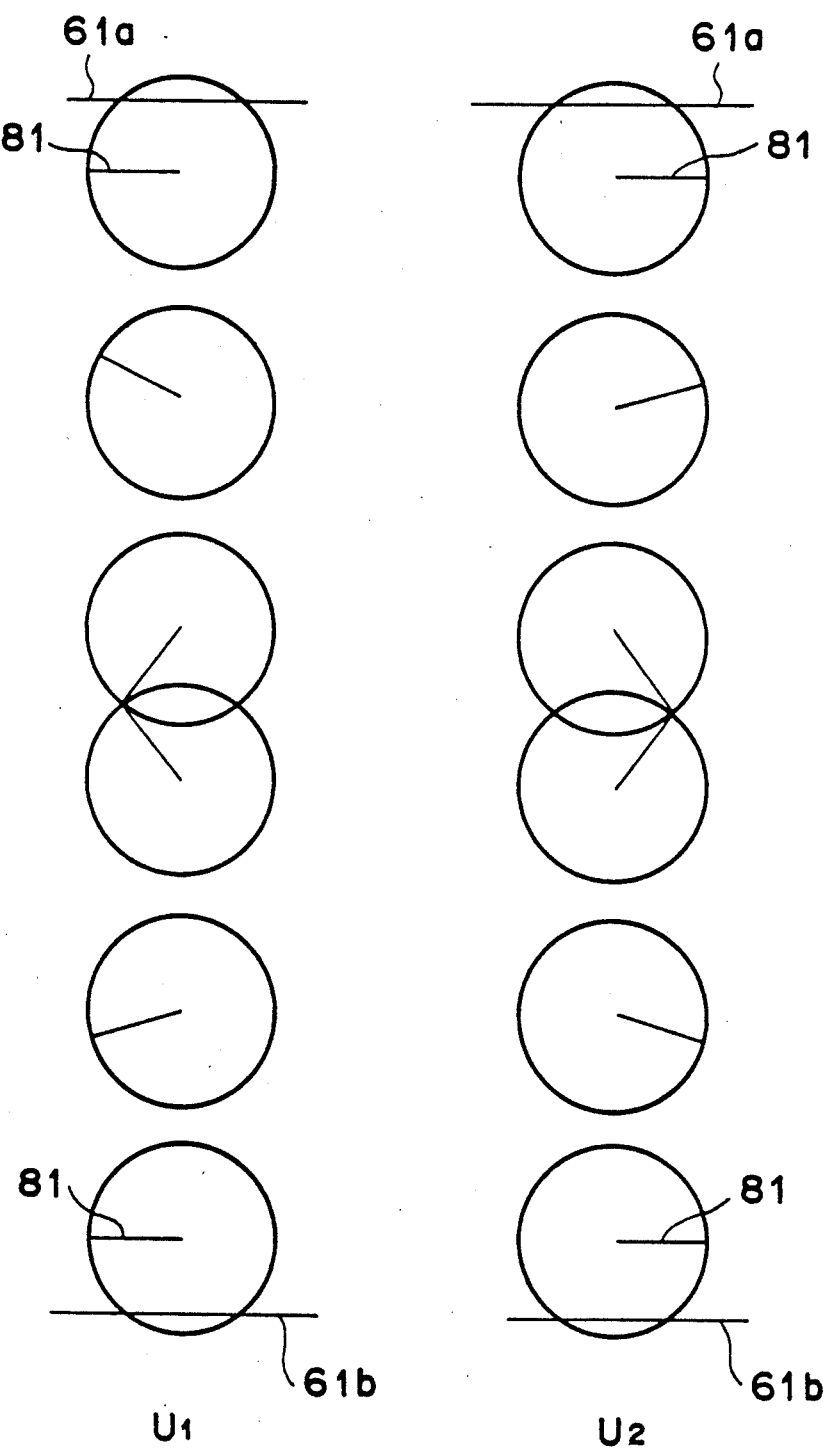
FIG. 4B illustrates C-directors of its two stable states of uniform alignment.

FIG. 4B illustrates C-directors in the state of uniform alignment. $U_1$ in FIG. 4B shows C-directors 81 which are in one state of stable alignment, and $U_2$, C-directors 81 which are the other state of stable alignment. Each C-director 81 is a projection of a molecular longitudinal axis (molecular axis) on an imaginary face perpendicular to the normal of the molecular layer 60 shown in FIG. 4A.

Figure 4C:
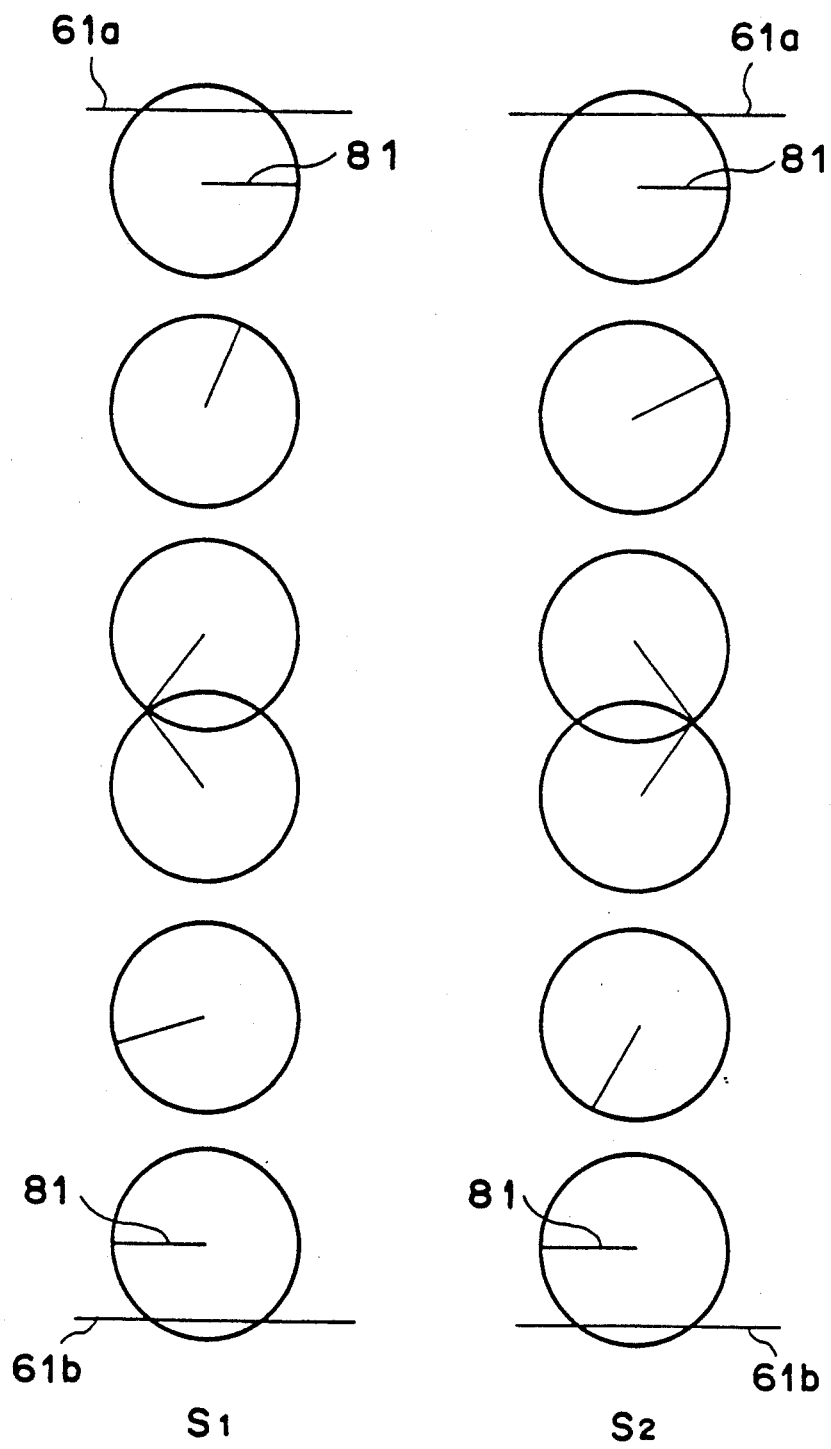
FIG. 4C illustrates C-directors of two stabel states of spray alignment.

On the other hand, the state of alignment as produced using a conventional rubbed polyamide film is illustrated by the C-directors in FIG. 4C. For the state of alignment as shown in FIG. 4C, the molecular axis is so largely twisted from the upper substrate 61a toward the lower substrate 61b that the tilt angle $\theta$ is small.

Figure 5A:
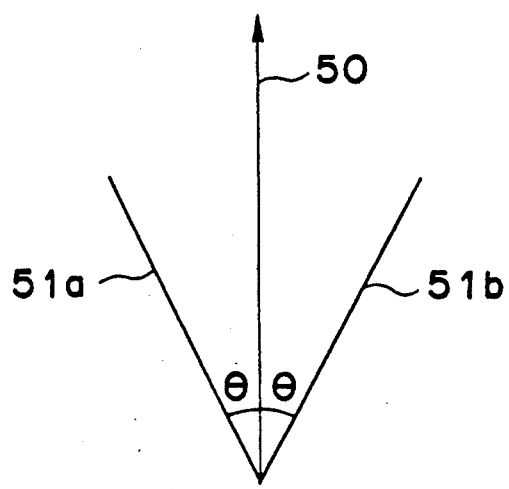
FIG. 5A is a plan to illustrate a tilt angle $\theta$ in the state of uniform alignment.
Figure 5B:
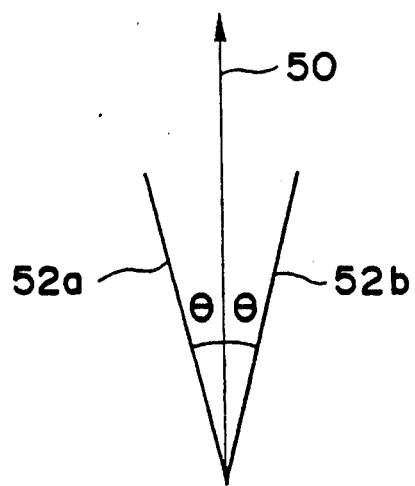
FIG. 5B is a plan to illustrate a tilt angle $\theta$ in the state of spray alignment.

FIG. 5A is a plan to show the tilt angle $\theta$ when the C-directors 81 are in the state of FIG. 4B (herein called "the state of uniform alignment"), and FIG. 5B is a plan to show the tilt angle $\theta$ when the C-directors 81 are in the state of FIG. 4C (herein called "the state of spray alignment"). In FIGS. 5A and 5B, the numeral 50 denotes the axis of rubbing treatment applied to the above-described polyimide film of the present invention or the direction in which a substrate is drawn up when the above-described polyimide film of the present invention is formed by the LB process. The numeral 51a denotes an average molecular axis formed in the state of alignment $U_1$; 51b, an average molecular axis formed in the state of alignment $U_2$; 52a, an average molecular axis formed in the state of alignment $S_1$; and 52b, an average molecular axis formed in the state of alignment $S_2$ The average molecular axes 51a and 51b can be converted by applying a voltage of reverse polarity which exceeds a threshold voltage each other. The same may also takes place between the average molecular axes 52a and 52b.

Usefulness of the state of uniform alignment to the delay of optical response (after-image) caused by a reverse electric field $V_{rev}$ will be explained below. When the capacity of an insulating layer (alignment control film) of a liquid crystal cell is represented by $C_i$, the capacity of a liquid crystal layer by $C_{LC}$, and the spontaneous polarization of a liquid crystal by $P_s$, the $V_{rev}$ that causes the after-image is represented by the following expression:

$$V_{rev} = 2 \cdot P_s / (C_i + C_{LC})$$

Figure 6A:
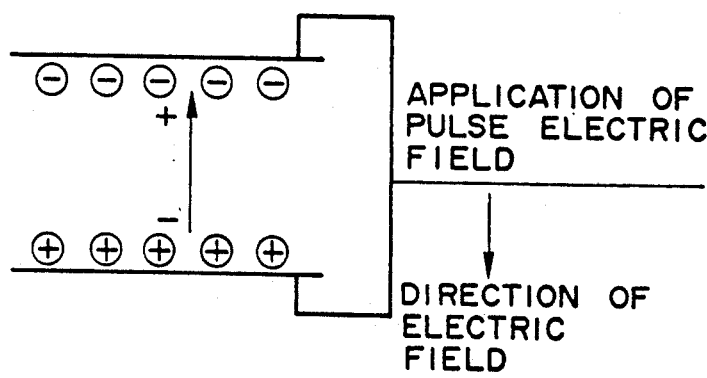
FIGS. 6A, 6B and 6C are cross-sectional illustrations of the distribution of electric charges in a ferroelectric liquid crystal, the direction of spontaneous polarization $P_s$, and the direction of a reverse electric field $V_{rev}$, respectively.
Figure 6B:
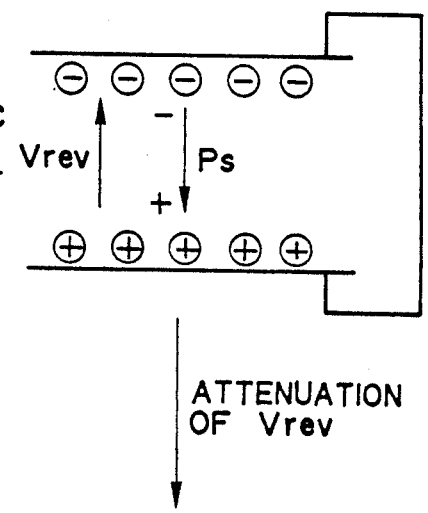
Figure 6C:
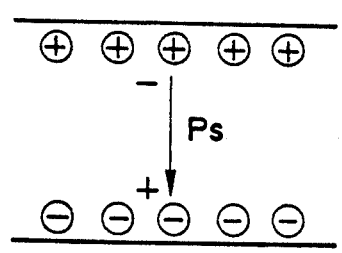

FIGS. 6A to 6C are cross-sectional views to illustrate the distribution of electric charges in a ferroelectric liquid crystal, the direction of spontaneous polarization $P_s$, and the direction of a reverse electric field $V_{rev}$, respectively. FIG. 6A shows the state of distribution of plus and minus electric charges in a memory state before application of a pulse electric field. The spontaneous polarization $P_s$ is in the direction from the plus electric charges to the minus electric charges. In FIG. 6B, immediately after removing the pulse electric field the spontaneous polarization $P_s$ is in a reverse direction to the direction in the state shown in FIG. 6A (hence, the liquid crystal molecules are reversed from the one state of stable alignment to the other state of stable alignment). Since, however, the state of distribution of plus and minus electric charges is the same as in the state shown in FIG. 6A, a reverse electric field $V_{rev}$ is produced in the liquid crystal in the direction of the arrow. This reverse electric field $V_{rev}$ disappears after a while as shown in FIG. 6C, and the state of distribution of plus and minus electric charges is changed.

Figure 7:
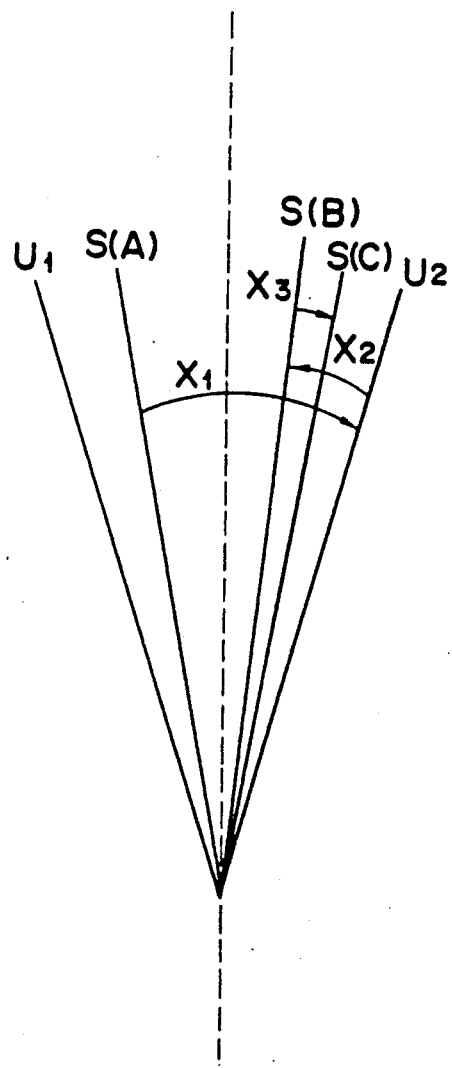
FIG. 7 is a plan to illustrate changes of the tilt angle $\theta$ at the time of application of an electric field and after that time.
Figure 8:
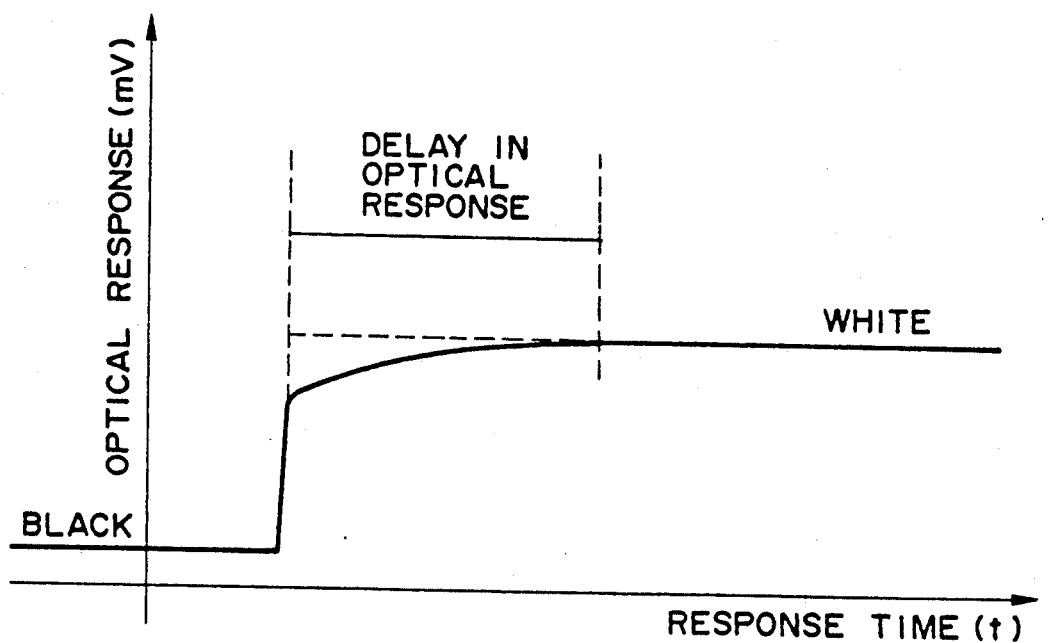
FIG. 8 illustrates optical response characteristics in an example of the prior art.

FIG. 7 illustrates changes of optical response occurring in the state of spray alignment as produced using a conventional polyimide aligning film, which are converted to changes of the tilt angle $\theta$. As shown in FIG. 7, when a pulse electric field is applied, the molecular axis is overshot from the average molecular axis S(A) formed in the state of spray alignment to the average molecular axis $U_2$ formed in the state of uniform alignment, which is in the vicinity of the maximum tilt angle $\Theta$, along the direction of an arrow $X_1$. Immediately after removal of the pulse electric field, the reverse electric field $V_{rev}$ as shown in FIG. 6B acts, and the tilt angle $\theta$ is decreased, along the direction of an arrow $X_2$, to the average molecular axis S(B) formed in the state of spray alignment. Then, a state of stable alignment can be obtained in which, because of the action of attenuation of the reverse electric field $V_{rev}$ as shown in FIG. 6C, the tilt angle $\theta$ has been a little increased, along the direction of en arrow $X_3$, to the average molecular axis S(C) formed in the state of spray alignment. Optical response obtained here is made clear in FIG. 8.

According to the present invention, employment of the aligning film of the present invention does not bring about such a state of alignment of a liquid crystal that the average molecular axes S(A), S(B) and S(C) are formed in the state of spray alignment as shown in FIG. 7, and hence makes it possible to align a liquid crystal to form an average molecular axis that may give a tilt angle $\theta$ approximate to the maximum tilt angle $\Theta$. Here, in the second embodiment of the present invention, the lower layer polyimide film mainly containing the structure represented by Formula (I) (i.e., the polyimide film A shown in FIG. 12A and the alternately laminated films of the polyimide films A and B other than the outermost layer, shown in FIG. 12B) is formed for the purposes of assuring the monoaxialness concerning initial liquid crystal alignment and also eliminating the influence the irregularities or the like of substrate surfaces (in practice, the insulating layers 13a and 13b) may have on the state of alignment of a liquid crystal. Hence, depending on the state of the lower layer polyimide film, the polyimide film B shown in FIG. 12A can be a single layer monomolecular film.

Figure 9:
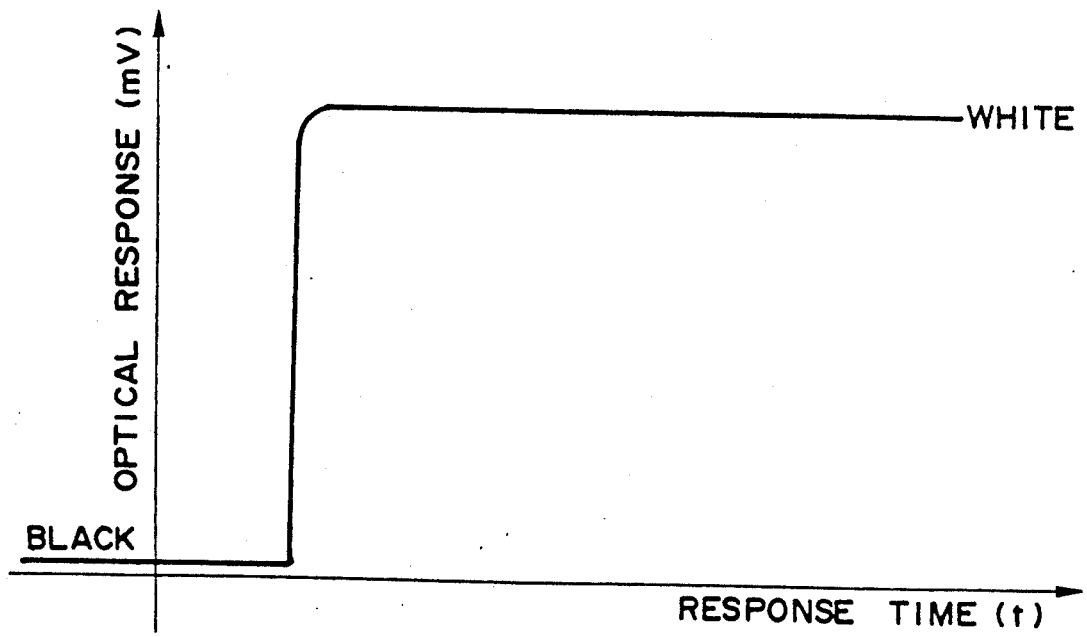
FIG. 9 illustrates optical response characteristics in an example of the present invention.

FIG. 9 shows optical response obtained when the polyimide aligning film of the present invention is used. As is evident from FIG. 9, no delay of optical response caused by the after-image occurs and also a high contrast is produced in a memory state.

According to experiments made by the present inventors, employment of the aligning method using the particular polyimide alignment film as will be made clearer in the following Examples has achieved a state of alignment that gives a high optical contrast between a light state and a dark state, in particular, gives a high contrast to unselected picture elements at the time of the multiplexing drive as disclosed in U.S. Pat. No. 4,655,561, etc., and also brings about no delay in optical response at the time of switching (at the time of multiplexing drive), which may cause the after-image at the time of display.

The present invention will be described below by giving Examples.

EXAMPLE 1

Two sheets of 1.1 mm thick glass plates each provided with a 1,000 Å thick ITO film were prepared. The respective glass substrates were left to stand in saturated vapor of hexamethyldisilazane (HMDS) to carry out hydrophobic treatment. Thereafter, on each substrate thus treated, a built-up film of polyimide monomolecular films built up in 2, 4, 6, 8, 10, 20, 30 or 40 layers was formed by the LB process to provide an aligning film without rubbing treatment.

The process of forming the built-up film of polyimide monomolecular films will be detailed below.

The polyamide acid represented by the formula (1) was dissolved in N,N-dimethylacetamide (in concentration of $1 \times 10^{-3}$ M in terms of the repeating unit polyamide acid), and thereafter the solution and a $2 \times 10^{-3}$ M solution separately prepared by dissolving N,N-dimethyloctadecylamine in the same solvent were mixed in equimolar amounts (v/v). A solution of the polyamide acid octadecylamine salt represented by the formula (2) was thus prepared.

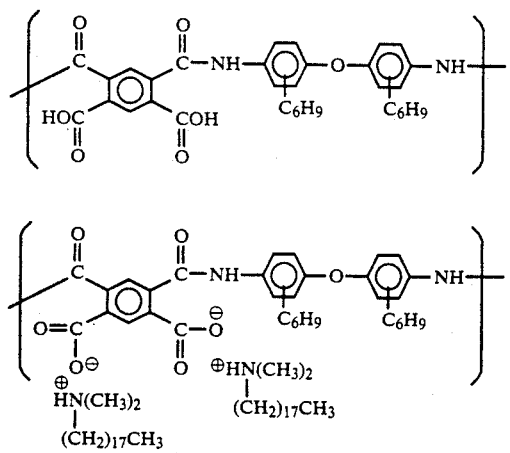

Figure 11:
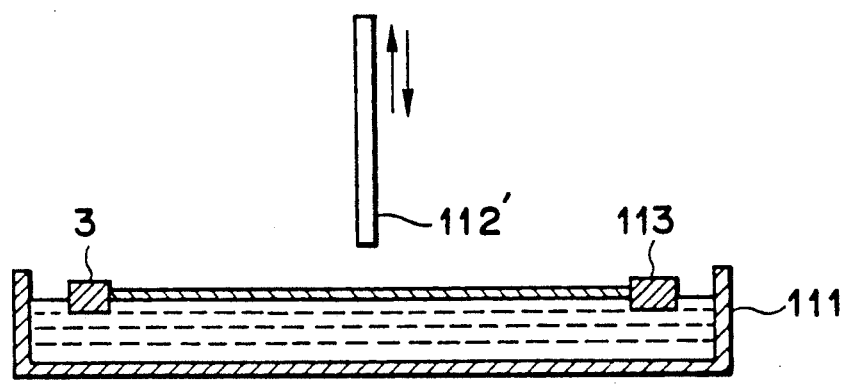
FIG. 11 illustrates a method of forming an aligning film of the present invention by the LB process.

The resulting solution was spread over an aqueous phase 111 (FIG. 11) comprised of pure water of 20° C. in water temperature to form a monomolecular film on the water surface. After removal of the solvent, a float as the partition plate 13 was moved to reduce the spreading area until the surface pressure was raised up to 25 mN/m. While keeping constant the surface pressure, the above ITO glass substrate was gently immersed at a rate of 5 mm/min in the direction crossing the water surface, and thereafter subsequently gently drain up at a rate of 3 mm/min, thus making a two-layer Y-type monomolecular built-up film. Such operations were repeated to form a monomolecular built-up film (LB film) having a given number of monomolecular layers and comprising the polyamide acid octadecyl salt. Next, such a substrate was heated in vacuo under conditions of a rate of temperature rise of 20° C./min and 300° C. constant-temperature heating for 10 minutes to carry out imidization. The desired aligning films were thus obtained.

Thereafter, alumina beads with an average particle diameter of 1.5 μm were sprayed on one of the glass substrates. Then, the two sheets of glass substrates were put together in such a way that the axes of dipping directions (directions on the upper and lower substrates) of the respective aligning films were in parallel and in the same treatment directions each other. A cell was thus fabricated.

Into the resulting cell, a ferroelectric smectic liquid crystal "CS-1014" (trade name a product of Chisso Corporation) was vacuum-injected in the state of an isotropic phase, and then annealed to 30° C. at a rate of 0.5° C./hr from the state of the isotropic phase. Thus, it was possible to align the liquid crystal. In the cell of the present Example in which this "CS-1014" was used, the phase changes were as follows:

(Iso: isotropic phase, Ch: cholesteric phase, SmA: smectic A phase, SmC*: chiral smectic C phase)

The liquid crystal cell provided with the aligning films each comprising the 10-layer LB film prepared as described above was inserted between a pair of 90° crossed nicols polarizers. Thereafter, a 30 V pulse for 50 μsec was applied the 90° crossed nicols were set to the position of extinction (a darkest state). Transmittance at this time was measured using a photomultiplier. Subsequently, a −30 V pulse for 50 μsec was applied, and transmittance at this time (a bright state) was measured in the same manner. As a result, it was revealed that the tilt angle θ was 16°, the transmittance in the darkest state was 0.9%, the transmittance in the bright state was 50%, and hence the ratio of contrast was 55:1.

The delay in optical response that causes an after-image was 0.2 second or less.

Figure 10:
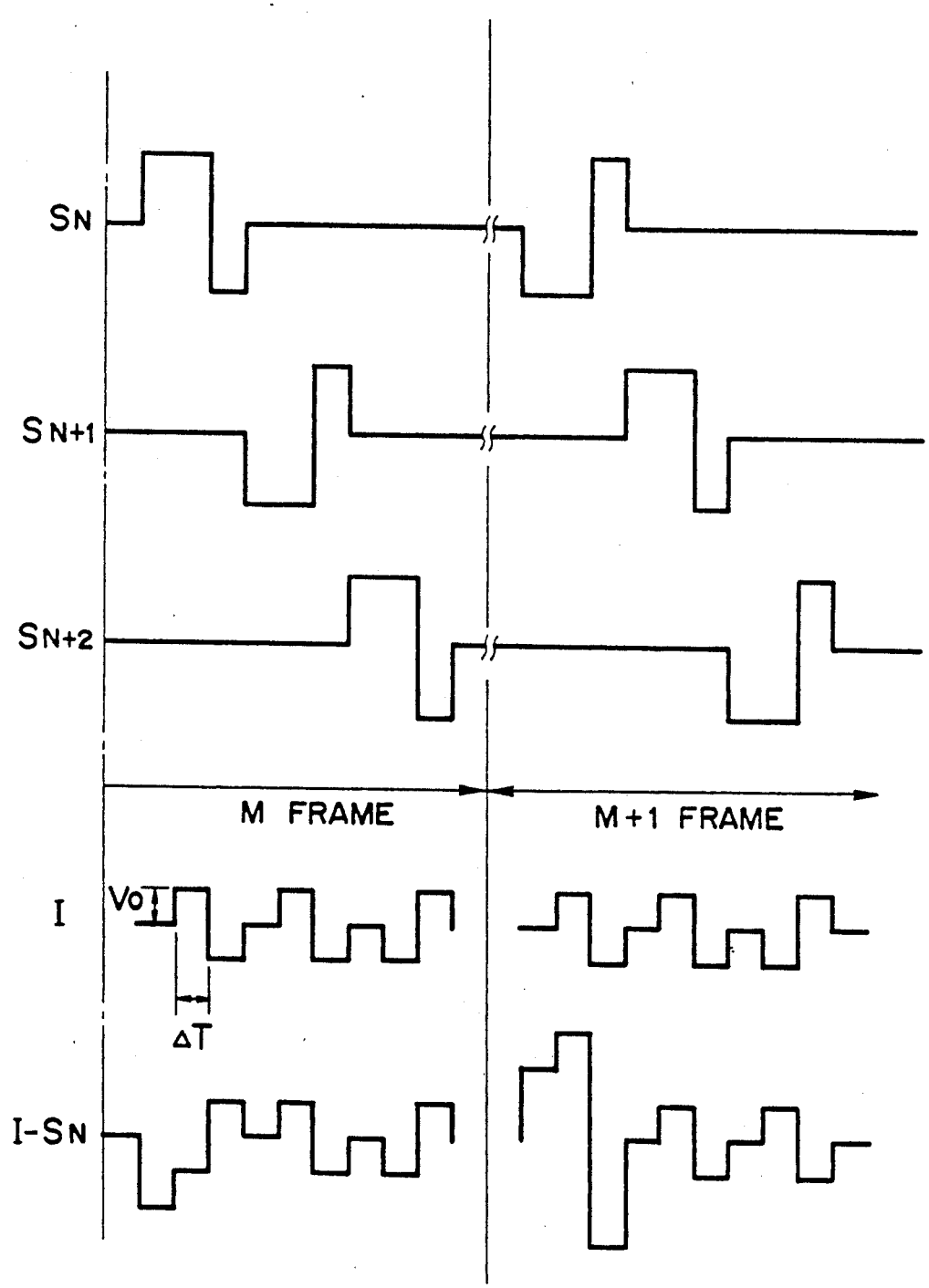
FIG. 10 illustrates wave forms of a drive voltage used in the Examples of the present invention.

Using this liquid crystal cell, display was carried out according to multiplexing drive in which the drive wave forms as shown in FIG. 10 were used. As a result, a display with a high contrast and high grade was obtained. After an image wa displayed by inputting given characters, the whole screen was turned off to a white state to confirm that no after-image was seen to have occurred. The letter symbols $S_N$, $S_{N+1}$ and $S_{N+2}$ in FIG. 10 represent wave forms of the voltages applied to scanning lines. The letter symbol I represents a wave form of the voltage applied to a typical information line. I-$S_N$ is a synthetic wave form of the voltage applied to the crossing area of the information line I and the scanning line $S_N$. In the present Example, experiments were made under conditions of V=5 V to 8 V and ΔT=20 μsec to 70 μsec. Results of experiments on dependence to the number of LB film layers are shown in Table 1.

TABLE 1

| Number LB film layers | Ratio of contrast | Delay in optical response |
|---|---|---|
| 2 | 42:1 | 0.2 sec or less |

TABLE 1-continued

| Number LB film layers | Ratio of contrast | Delay in optical response |
|---|---|---|
| 4 | 43:1 | 0.2 sec or less |
| 6 | 53:1 | 0.2 sec or less |
| 8 | 55:1 | 0.2 sec or less |
| 10 | 55:1 | 0.2 sec or less |
| 20 | 51:1 | 0.2 sec |
| 30 | 51:1 | 0.3 sec |
| 40 | 51:1 | 0.4 sec |

Regardless of the number of the LB film layers, it was possible to obtain alignment films with superior switching characteristics compared with conventional aligning films.

EXAMPLE 2

Two sheets of 1.1 mm thick glass plates each provided with a 1,000 Å thick ITO film were prepared in the same manner as in Example 1. The respective glass substrates were coated with a solution of 3.0% by weight of the polyamide acid represented by Formula (1) as used in Example 1, dissolved in a 5/1 mixed solvent of N-methylpyrrolidone/n-butyl cellosolve, for 30 minutes using a spin coater of 3,000 rpm. After films were formed, each film was heated and baked at 300° C. for about 1 hour. The film hereby formed had a thickness of 250 Å. The resulting coating film was subjected to rubbing in one direction using a nylon cloth. Thereafter, in the same manner as in Example 1, a cell was fabricated and the ratio of contrast and the delay in optical response were measured to reveal that excellent device characteristics were obtainable like the case when films were prepared by the LB process.

Ratio of contrast: 50:1.

Delay in optical response: 0.4 sec.

Display was also carried out according to multiplexing drive in the same manner as in Example 1 to obtain the same results as in Example 1 in respect of contrast and after-image.

EXAMPLES 3 to 10

Cells were obtained in the same manner as in Example 1 except that the alignment control films (alignment films) and liquid crystal materials as shown in Table 2 were used. The respective cells were tested in the same manner as in Example 1. Results obtained in respect of the ratio of contrast and the delay in optical response are shown in Table 3.

Display was also carried out according to multiplexing drive in the same manner as in Example 1 to obtain the same results as in Example 1 in respect of contrast and after-image.

TABLE 2

| No. | Alignment film (precursor: polyamide acid) | Liquid crystal material |
|---|---|---|
| 1. | [structure: benzene ring with two -C(=O)- groups, two -COOH groups, linked -NH-phenyl($C_4H_9$)-O-phenyl($C_4H_9$)-NH-] | CS1014 (trade name) A ferroelectric liquid crystal, a product of Chisso Corporation |
| 2. | [structure: benzene ring with two -C(=O)- groups, two -COOH groups, linked -NH-phenyl($C_{10}H_{21}$)-O-phenyl($C_{10}H_{21}$)-NH-] | CS1014 (trade name) A ferroelectric liquid crystal, a product of Chisso Corporation |
| 3. | [structure: benzene ring with two -C(=O)- groups, two -COOH groups, linked -NH-phenyl($C_4H_9$)-$CH_2$-phenyl($C_4H_9$)-NH-] | CS1014 (trade name) A ferroelectric liquid crystal, a product of Chisso Corporation |
| 4. | [structure: biphenyl with two -C(=O)- and two -COOH groups, linked -NH-phenyl($C_4H_9$)-O-phenyl($C_4H_9$)-NH-] | CS1014 (trade name), A ferroelectric liquid crystal, a product of Chisso Corporation |
| 5. | [structure: biphenyl with two -C(=O)- and two -COOH groups, linked -NH-phenyl($C_4H_9$)-O-phenyl($C_4H_9$)-C($CF_3$)$_2$-phenyl($C_4H_9$)-O-phenyl($C_4H_9$)-NH-] | CS1014 (trade name), A ferroelectric liquid crystal, a product of Chisso Corporation |
| 6. | [structure: benzene with two -C(=O)- and two -COOH groups, linked -NH-phenyl($C_4H_9$)-O-phenyl($C_4H_9$)-C($CF_3$)$_2$-phenyl($C_4H_9$)-O-phenyl($C_4H_9$)-NH-] | CS1014 (trade name), A ferroelectric liquid crystal, a product of Chisso Corporation |

TABLE 2-continued

| No. | Alignment film (precursor: polyamide acid) | Liquid crystal material |
| --- | --- | --- |
| 7. | [chemical structure: benzene ring with -C(=O)- and HOC(=O)- and C$_4$H$_9$ substituents, linked via C(=O)-NH-phenyl-O-phenyl-NH- with C$_4$H$_9$ groups] | CS1014 (trade name) A ferroelectric liquid crystal, a product of Chisso Corporation |
| 8. | [chemical structure: with -C(=O)-, HOC(=O)-, (C$_4$H$_9$)$_2$, -O-phenyl-O-phenyl-O-, benzene ring, COH, C(=O)-NH-phenyl-O-phenyl-NH- with C$_4$H$_9$ groups] | CS1014 (trade name) A ferroelectric liquid crystal, a product of Chisso Corporation |

TABLE 3

| Example | Alignment film No.* | Number of LB film layers | Ratio of contrast | Delay in optical response |
| --- | --- | --- | --- | --- |
| 3 | 1 | 8 | 55:1 | 0.2 sec or less |
| 4 | 2 | 8 | 40:1 | 0.8 sec |
| 5 | 3 | 8 | 52:1 | 0.2 sec or less |
| 6 | 4 | 8 | 50:1 | 0.2 sec or less |
| 7 | 5 | 8 | 58:1 | 0.2 sec or less |
| 8 | 6 | 8 | 58:1 | 0.2 sec or less |
| 9 | 7 | 8 | 53:1 | 0.2 sec or less |
| 10 | 8 | 8 | 50:1 | 0.2 sec or less |

*No. in Table 2

EXAMPLES 11 to 15

Cells were obtained in the same manner as in Example 2 except that the alignment control films (alignment films) and liquid crystal materials as shown in Table 2 were used. The respective cells were tested in the same manner as in Example 1. Results obtained in respect of the ratio of contrast and the delay in optical response are shown in Table 4.

Display was also carried out according to multiplexing drive in the same manner as in Example 1 to obtain the same results as in Example 1 in respect of contrast and after-image.

TABLE 4

| Example | Alignment film No.* | Number of LB film layers | Ratio of contrast | Delay in optical response |
| --- | --- | --- | --- | --- |
| 11 | 3 | 200 | 50:1 | 0.4 sec |
| 12 | 4 | 190 | 47:1 | 0.4 sec |
| 13 | 5 | 200 | 53:1 | 0.4 sec |
| 14 | 7 | 220 | 49:1 | 0.4 sec |
| 15 | 8 | 210 | 44:1 | 0.4 sec |

*No. in Table 2

COMPARATIVE EXAMPLES 1 to 4

Cells were fabricated in the same manner as in Example 2 except that the alignment control films (alignment films) and liquid crystal materials as shown in Table 5 were used. The respective cells were tested in the same manner as in Example 1. Results obtained in respect of the ratio of contrast and the delay in optical response are shown in Table 6.

Display was also carried out according to multiplexing drive in the same manner as in Example 1 to obtain the results that the contrast was lower than that of Examples of the present invention and also after-image occurred.

TABLE 5

| Comparative Example: | Alignment film (polyamide acid varnish) | Liquid crystal material |
| --- | --- | --- |
| 1 | SP-710 (trade name)* | CS1014*** |
| 2 | " | " |
| 3 | LQ-5200 (trade name)** | CS1014*** |
| 4 | " | " |

*An aromatic polyimide varnish, a product of Toray Industries, Inc.
**A polyimide varnish, a product of Hitachi Chemical Co., Ltd.
***FLC, a product of Chisso Corporation

TABLE 6

| Comparative Example: | Ratio of contrast | Delay in optical response |
| --- | --- | --- |
| 1 | 8:1 | 1.5 sec |
| 2 | 7:1 | 2.5 sec |
| 3 | 10:1 | 1.2 sec |
| 4 | 8:1 | 2.2 sec |

In the above Examples, characteristics of liquid crystal devices prepared using the ferroelectric liquid crystal CS-1014 were evaluated. The liquid crystal materials used are by no means limited to ferroelectric liquid crystals. For example, nematic liquid crystals, cholesteric liquid crystals and smectic liquid crystals can also be used alone or in the form of a mixture. An example of a device in which a nematic liquid crystal is used is shown below.

EXAMPLE 16

Substrates were prepared in the same manner as in Example 2. The substrates were put together in such a manner that the rubbing directions may cross at right angles, and peripheral edges thereof were sealed using a heat-curable epoxy resin, except for an injection opening. The space between the substrates was 6 μm.

Next, a nematic liquid crystal (ZLI-1285, a product of Merck AG., West Germany) was injected into the cell, and then the injection opening was sealed.

A pair of polarizers were disposed in parallel to the rubbing direction of an adjacent substrate, and the liquid crystal was observed with a microscope to confirm that twisted alignment was achieved in a superior uniformity.

Using this liquid crystal device, a continuous operation test was carried out.

As a result, a good twisted alignment was retained even after drive for 30 days using an alternating current of 10 V at 50 Hz, and thus superior durability was confirmed.

EXAMPLE 17

Two sheets of 1.1 mm thick glass plates each comprising a 1,500 Å thick ITO film provided thereon with a 600 Å thick $Ta_2O_5$ film were prepared as substrates. The resulting substrates were subjected to ultrasonic cleaning using isopropyl alcohol and thereafter left to stand for 24 hours in saturated vapor of hexamethyldisilazane to carry out hydrophobic treatment. Subsequently, on each substrate thus treated, a polyimide aligning film was formed by the LB process. The process of forming the polyimide alignment film will be detailed below.

The polyamide acid represented by the formula (3) was dissolved in a solvent N,N'-dimethylacetamide (in concentration of $1 \times 10^{-3}$ M in terms of the monomer), and thereafter the solution and a $1 \times 10^{-3}$ M solution separately prepared by dissolving di-n-decylamine in the same solvent were mixed in a ratio of 1:2 (v/v). A solution of the polyamide acid di-n-decylamine salt represented by the formula (4) was thus prepared.

The resulting solution was spread over an aqueous phase comprised of pure water of 20° C. in water temperature to form a monomolecular film on the water surface. After removal of the solvent, the surface pressure was raised up to 20 mN/m. While keeping constant the surface pressure, the above substrate was gently immersed at a rate of 5 mm/min in the direction crossing the water surface, and thereafter subsequently gently drain up at a rate of 5 mm/min, thus making a built-up film of two-layer Y-type monomolecular films. Such operations were repeated to form a built-up film of seven-layer monomolecular films comprising the polyamide acid di-n-decylamine salt of the formula (4). Here, the substrate was kept immersed in the water. While keeping such a state, the monomolecular film of the polyamide acid di-n-decylamine salt on the aqueous phase was once removed, and a monomolecular film of a fluorine-containing polyamide acid di-n-decylamine salt represented by the formula (5) was afresh formed on the aqueous phase. This was carried out by the same method as described above.

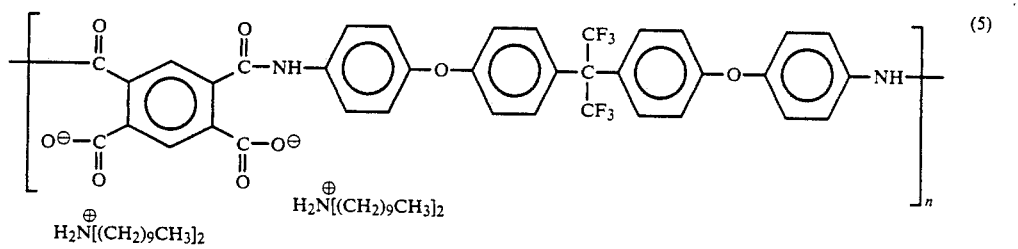
(5)

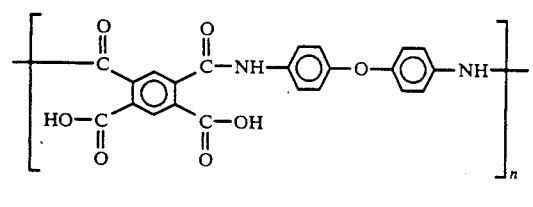
(3)

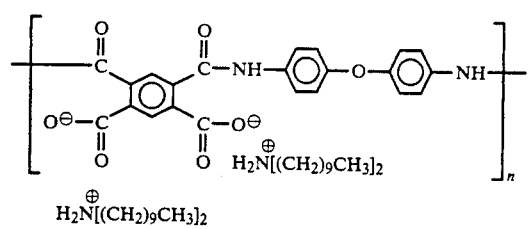
(4)

The surface pressure was raised up to 15 mN/m. Thereafter, while keeping constant the surface pressure, the above substrate kept immersed in water was gently drain up at a rate of 5 mm/min in the direction crossing the water surface. A built-up film of a single-layer monomolecular film of the fluorine-containing polyamide acid di-n-decylamine salt (5) was thus formed on the built-up film of the seven-layer monomolecular films of the polyamide acid di-n-decylamine salt (4). Next, such a substrate was subjected to heat treatment at 300° C. for 20 minutes to carry out imidization (formulas (6) and (7)) of the respective polyamide acid salts.

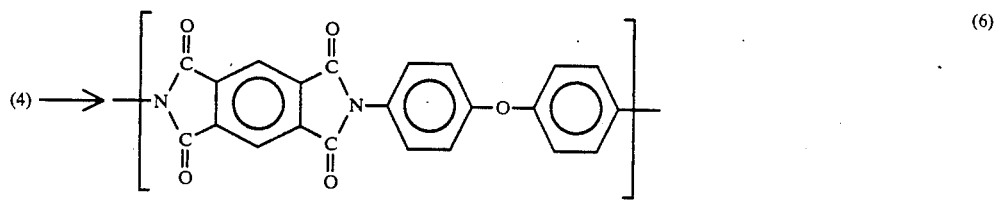
(6)

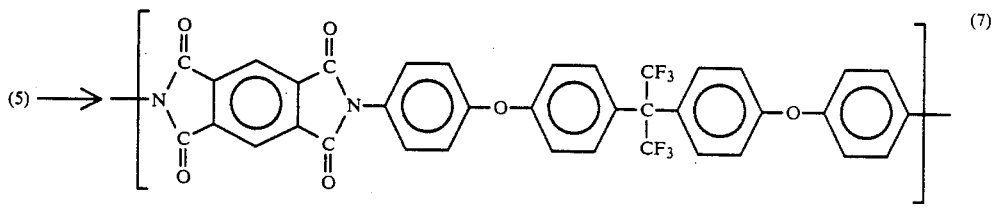
(7)

Polyimide alignment films each comprising a built-up film of polyamide monomolecular films of 8 layers in total were thus obtained. Thereafter, alumina beads with an average particle diameter of 1.5 μm were sprayed on one of the substrates. Then, the two sheets of substrates were put together in such a way that the drawing-up directions of the respective substrates were in parallel and in the same directions each other. A liquid crystal cell was thus fabricated.

Into the resulting cell, a ferroelectric smectic liquid crystal "CS-1014" (trade name; a product of Chisso Corporation) was vacuum-injected in the state of an isotropic phase, and then cooled slowly up to 30° C. at a rate of 0.5° C./hr from the state of the isotropic phase to from an aligned state. Thus, it was possible to align the liquid crystal. In the cell of the present Example in which this "CS-1014" was used, the phase changes were as follows:

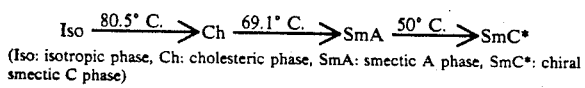

(Iso: isotropic phase, Ch: cholesteric phase, SmA: smectic A phase, SmC*: chiral smectic C phase)

The above liquid crystal cell was inserted between a pair of 90° crossed nicols polarizers. Thereafter, a 30 V pulse for 50 μsec was applied thereto and then the 90° crossed nicols were set to the position of extinction (a darkest state). Transmittance at this time was measured using a photomultiplier. Subsequently, a −30 V pulse for 50 μsec was applied, and transmittance at this time (a bright state) was measured in the same manner. As a result, it was revealed that the tilt angle θ was 15°, the transmittance in the darkest state was 0.9% and on the other hand the transmittance in the bright state was 45%, and hence the ratio of contrast was 50:1. The delay in optical response that causes an after-image was 0.2 second or less.

Using this liquid crystal cell, display was carried out according to multiplexing drive in which the drive wave forms as shown in FIG. 10 were used. As a result, a display with a high contrast and high grade was obtained. After an image was displayed by inputting given characters, the whole screen was turned off to a white state to confirm that no after-image was seen to have occurred. The letter symbols $S_N$, $S_{N+1}$ and $S_{N+2}$ in FIG. 10 represent wave forms of the voltages applied to scanning lines. The letter symbol I represents a wave form of the voltage applied to a typical information line. I-$S_N$ is a synthetic wave form of the voltage applied to the crossing area of the information line I and the scanning line $S_N$. In the present Example, experiments were made under conditions of $V_O = 5$ V to 8 V and $\Delta T = 20$ μsec to 70 μsec.

EXAMPLE 18

A liquid crystal cell was prepared in entirely the same manner as in Example 17, except that as the method of forming the polyimide film A (FIG. 12A) the LB process was replaced with coating. Different points are described below.

The substrates were coated with a solution of 3.0% by weight of the polyamide acid (3) dissolved in a 5/1 mixed solvent of N-methylpyrrolidone/n-butyl cellosolve, for 10 minutes using a spin coater of 3,000 rpm. After films were formed, each film was heated and baked at 270° C. for about 1 hour to carry out imidization A polyimide film A of 200 Å thick comprising the polyimide (6) was thus formed. On the resulting substrate, 6 layers of monomolecular films of the fluorine-containing polyamide acid di-n-decylamine salt (5) were built up by the LB process in the same manner as in Example 17. Thereafter, the resulting substrate was subjected to heat treatment at 300° C. for 20 minutes to form a polyimide film B comprising a built-up film of monomolecular films (6 layers). Thereafter, in the same manner as in Example 17, a cell was fabricated and the ratio of contrast and the delay in optical response were measured to reveal that former was 50:1 or more and the latter was 0.7 seconds or less. Display was also carried out according to multiplexing drive in the same manner as in Example 17 to obtain the same results as in Example 17 in respect of contrast and after-image.

EXAMPLES 19 to 22

Liquid crystal cells were obtained in the same manner as in Example 17 except that the alignment films having the aligning film constitution and polyimide structure as shown in Table 7 were used. Test results on the ratio of contrast and the delay in optical response are shown in Table 8. Display was also carried out according to multiplexing drive in the same manner as in Example 17 to obtain the same after-image.

COMPARATIVE EXAMPLES 5 to 7

Liquid crystal cells were fabricated in the same manner as in Example 17 except that the alignment control films (aligning films) as shown in Table 9 were used. Test results on the ratio of contrast and the delay in optical response are shown in the same Table 9. Display was also carried out according to multiplexing drive in the same manner as in Example 17 to obtain the results that the contrast was lower than that of Examples of the present invention and also after-image occurred.

TABLE 7

| Example | Polyimide Alignment film constitution | Polyimide structure | Polyimide film forming method | Polyimide film thickness |
|---|---|---|---|---|
| 19 | FIG. 12A | Polyimide film A: Formula (6) | LB proc. | 28 Å (7 layers) |
|  |  | Polyimide film B: A 1:1 copolymer of | LB proc. | 5 Å (1 layer) |

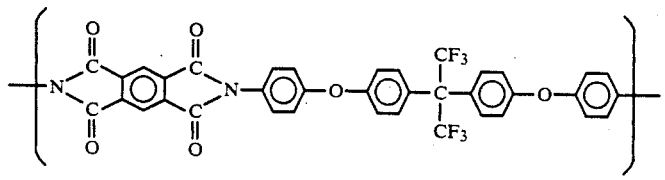

TABLE 7-continued

| Example | Polyimide Alignment film constitution | Polyimide structure and | Polyimide film forming method | Polyimide film thickness |
|---|---|---|---|---|
| 20 | FIG. 12A | Polyimide film A: | LB proc. | 28 Å (7 layers) |
|  |  | Polyimide film B: | LB proc. | 5 Å (1 layer) |
| 21 | FIG. 12A | Polyimide film A: Formula (6) Polyimide film B: The same as Example 19 | Coating | 200 Å |
| 22 | FIG. 12B | Polyimide film A: Formula (6) Polyimide film B: Formula (7) | LB proc. LB proc. LB proc. | 30 Å (6 layers) 4 Å/layer × 4 5 Å/layer × 4 36 Å (8 layers) in total |

TABLE 8

| Example | Ratio of contrast | Delay in optical response (sec) |
|---|---|---|
| 19 | 45:1 | 0.2 |
| 20 | 50:1 | 0.2 |
| 21 | 45:1 | 0.8 |
| 22 | 55:1 | 0.2 |

TABLE 9

| Comparative Example: | Polyimide alignment film | Film forming process | Ratio of contrast | Delay in optical response (sec) |
|---|---|---|---|---|
| 5 | SP-710*[1] | Coating*[3] | 8:1 | 1.5 |
| 6 | LQ-5200*[2] | " | 10:1 | 1.2 |
| 7 | SP-510*[1] | LB process*[4] | 10:1 | 0.7 |

*[1](trade name; a product of Toray Industries, Inc.)
*[2](trade name; a product of Hitachi Chemical Co.)
*[3]200 Å thick, rubbing treatment
*[4]32 Å thick, 8 layers, no rubbing treatment As will be evident from the above Examples and Comparative Example, the present invention has the effect that it can achieve a high contrast between a bright state and a dark state, in particular, can achieve a very high display contrast in multiplexing drive to obtain a display of high quality level, and also may not cause the after-image phenomenon that is offensive to the eye.

We claim:

1. A liquid crystal device comprising a pair of substrates and a liquid crystal material disposed between said pair of substrates, wherein at least one of said substrates is provided with a film comprising a polyimide compound having in its polyimide main-chain structural unit at least one alkyl side chain containing an alkyl chain moiety having a length of 2 to 10 carbon atoms.

2. A liquid crystal device according to claim 1, wherein said alkyl chain is a straight-alkyl chain.

3. A liquid crystal device according to claim 1, wherein said polyimide film is a monomolecular film or a built-up film of monomolecular films.

4. A liquid crystal device according to claim 1, wherein said liquid crystal material is a ferroelectric liquid crystal.

5. A liquid crystal device according to claim 1, wherein said polyimide film comprising said polyimide compound is a film obtained by imidation of a polyamide acid synthesized by condensation reaction of a carboxylic anhydride with a diamine, at least one of said carboxylic anhydride or said diamine is substituted with an alkyl group.

6. A liquid crystal device according to claim 5, wherein said carboxylic anhydride or a diamine at least one of which is substituted with an alkyl group is selected from the group consisting of:

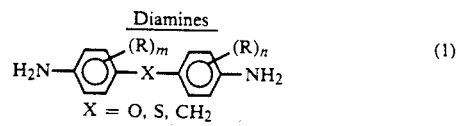

Diamines $$H_2N-\underset{}{\underset{}{\bigcirc}}_{(R)_m}-X-\underset{}{\underset{}{\bigcirc}}_{(R)_n}-NH_2 \quad (1)$$

$X = O, S, CH_2$

-continued

Diamines and

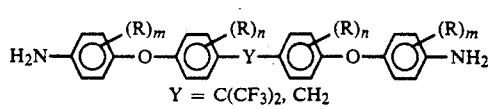

Carboxylic acid anhydrides

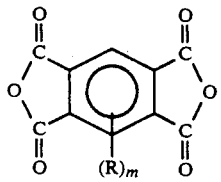

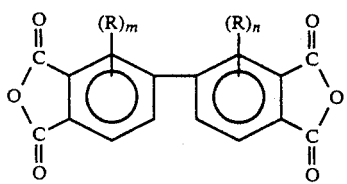

and

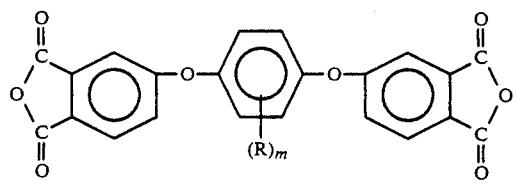

wherein m and n each represent an integer of 0, 1 to 3; R is selected from the groups consisting of: normal—$C_lH_{2l+1}$—, l=an integer of 2 to 10; normal—$C_lH_{2l+1}CO$—, l=an integer of 2 to 10; normal—$C_lH_{2l+1}O$—, l=an integer of 2 to 10; normal $CF_3(CF_2)_k(CH_2)_l$—, l+k=an integer of 2 to 10 and k=2, 3 or 5; normal $CF_3(CF_2)_k(CH_2)_lCO$—, l+k=an integer of 2 to 10 and k=2, 3 or 5; $(CF_3)_2CF(CH_2)_l$—, l=an integer of 0, 1 to 8; or $(CF_3)_2CF(CH_2)_lCO$—, l=an integer of 0, 1 to 8 and R can be combined with different two or more kinds of the group thereof.

7. A liquid crystal device according to claim 1, wherein said polyimide film has a film thickness of from 10 Å to 1 μm.

8. A liquid crystal device according to claim 1, wherein said polyimide film has a film thickness of from 30 Å to 2,000 Å.

9. A liquid crystal device according to claim 1, wherein said polyimide film has a film thickness of from 30 Å to 300 Å.

10. A method of driving a liquid crystal device, comprising bringing the liquid crystal device according to claim 1 into multiplexing drive.

11. A method of driving a liquid crystal device according to claim 10, wherein said polyamide film is a monomolecular film or a built-up film of monomolecular films.

12. A method of driving a liquid crystal device according to claim 10, wherein said liquid crystal material comprises a ferroelectric liquid crystal.

13. A method of driving a liquid crystal device according to claim 10, wherein said polyimide film comprising said polyimide compound is a film obtained by imidation of a polyamide acid synthesized by condensation reaction of a carboxylic anhydride with a diamine at least one of which has been substituted with an alkyl group.

14. A method of driving a liquid crystal device according to claim 13, wherein said carboxylic anhydride or a diamine at least one of which has been substituted with an alkyl group is selected from the group consisting of:

Diamines

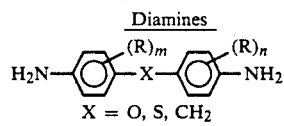

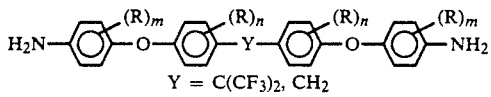

Carboxylic acid anhydrides

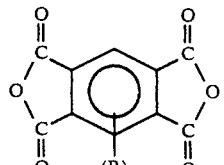

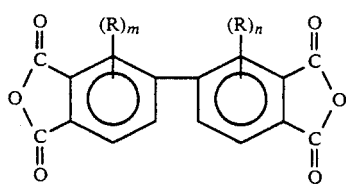

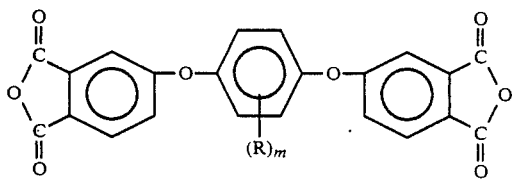

wherein m and n each represent an integer of 0, 1 to 3; R is selected from the group consisting of: normal—$C_lH_{2l+1}$—, l=an integer of 2 to 10; normal—$C_lH_{2l+1}CO$—, l=an integer of 2 to 10; normal—$C_lH_{2l+1}O$—, l=an integer of 2 to 10; normal $CF_3(CF_2)_k(CH_2)_l$—, l+k=an integer of 2 to 10 and k=2, 3 or 5; normal $CF_3(CF_2)_k(CH_2)_lCO$—, l+k=an integer of 2 to 10 and k=2, 3 or 5; $(CF_3)_2CF(CH_2)_l$—, l=an integer of 0, 1 to 8; or $(CF_3)_2CF(CH_2)_lCO$—, l=an integer of 0, 1 to 8 and R can be combined with different two or more kinds of the group thereof.

15. A liquid crystal device according to claim 10, wherein said polyimide film has a film thickness of from 10 Å to 1 μm.

16. A method of driving a liquid crystal device according to claim 10, wherein said polyimide film has a film thickness of from 30 Å to 2,000 Å.

17. A method of driving a liquid crystal device according to claim 10, wherein said polyimide film has a film thickness of from 30 Å to 300 Å.

* * * * *

UNITED STATES PATENT AND TRADEMARK OFFICE
CERTIFICATE OF CORRECTION

PATENT NO. : 5,046,822
DATED : September 10, 1991
INVENTOR(S) : HIROSHI MATSUDA ET AL.    Page 1 of 6

It is certified that error appears in the above-identified patent and that said Letters Patent is hereby corrected as shown below:

AT [57] ABSTRACT

Line 2, "said" should read --a--.

COLUMN 1

Line 7, "device," should read --device--.
Line 37, "occur," should read --occur--.
Line 61, "22°." should read --22.5°.--.
Line 65, "normal" should read --normal axis--.

COLUMN 2

Line 20, "angle θ" should read --angle θ in the non-spiral structure--.
Line 21, "angle θ" should read --angle θ in the spiral structure--.
Line 28, "en" should read --an--.
Line 31, "normal" should read --normal axis--.
Line 56, "crystal," should read --crystal, which--.
Line 57, "display," should read --display--.

COLUMN 3

Line 62, "stabel" should read --stable--.

COLUMN 4

Line 16, "illustrates" should read --illustrate--.
Line 23, "diagramatically" should read --diagrammatically--.
Line 29, "(SiO$_2$films," should read --(SiO$_2$ films,--.
Line 41, "small enough" should be deleted.

UNITED STATES PATENT AND TRADEMARK OFFICE
CERTIFICATE OF CORRECTION

PATENT NO. : 5,046,822

DATED : September 10, 1991

INVENTOR(S) : HIROSHI MATSUDA ET AL.    Page 2 of 6

It is certified that error appears in the above-identified patent and that said Letters Patent is hereby corrected as shown below:

COLUMN 5

Line 27, "1=an" should read --$\ell$=an--.
Line 28, "1=an" should read --$\ell$=an--.
Line 29, "1=an" should read --$\ell$=an--.
Line 30, "1+k=an" should read --$\ell$+k=an--.
Line 32, "1+k=an" should read --$\ell$+k=an--.
Line 33, "$(CF_3)_2CF(CH_2)_\ell$, 1=an" should read
--$(CF_3)_2CF(CH_2)_\ell$--, $\ell$=an--.
Line 34, "1=an" should read --$\ell$=an--.
Line 39, "o" should read --or--.
Line 47, "provide" should read --provided--.
Line 50, "dimehtylformamide" should read
--dimethylformamide--.

COLUMN 6

Line 28, "(I) ," should read --(I),--.
Line 35, "-diphenylsulfonetet-" should read
-- -diphenylsulfonetet- --.

COLUMN 8

Line 9, "octad-" should read --octade- --.
Line 27, "acid" should read --acid.--.
Line 32, "ions" should read --ion--.

COLUMN 9

Line 19, "though" should be deleted.
Line 53, "e" should read --a--.

UNITED STATES PATENT AND TRADEMARK OFFICE
CERTIFICATE OF CORRECTION

PATENT NO. : 5,046,822
DATED : September 10, 1991
INVENTOR(S) : HIROSHI MATSUDA ET AL.

It is certified that error appears in the above-identified patent and that said Letters Patent is hereby corrected as shown below:

COLUMN 10

Line 15, "diagramatical" should read --diagrammatical--.
Line 17, "denotes" should read --denote--.
Line 39, "each" should read --to each--.
Line 67, "response." should read --response--.

COLUMN 11

Line 9, "their" should read --its--.
Line 14, "diagramatically" should read --diagrammatically--.
Line 16, "produoed" should read --produced--.
Line 30, "normal" should read --normal axis--.
Line 45, "invention" should read --invention,--.
Line 53, "$S_2$" should read --$S_2$.--.
Line 56, "voltage" should read --voltage of-- and "takes" should read --take--.

COLUMN 12

Line 41, "en" should read --an--.

COLUMN 13

Line 62, "plate 13" should read --plate 113--.

UNITED STATES PATENT AND TRADEMARK OFFICE
CERTIFICATE OF CORRECTION

PATENT NO. : 5,046,822
DATED : September 10, 1991
INVENTOR(S) : HIROSHI MATSUDA ET AL.          Page 4 of 6

It is certified that error appears in the above-identified patent and that said Letters Patent is hereby corrected as shown below:

COLUMN 14

Line 16, "each" should read --with each--.
Line 19, "name" should read --name;--.
Line 36, "applied" should read
    --applied thereto and then--.
Line 51, "wa" should read --was--.
Line 61, "V=5 V" should read --$V_0$=5 V--.

COLUMN 16

Line 12, "of" should read --to--.
Line 25, "of" should read --to--.

COLUMN 17

Line 44, "of" should read --to--.
Line 63, "of" should read --to--.

COLUMN 20

Line 9, "drain" should read --drawn--.
Line 35, "drain" should read --drawn--.

COLUMN 21

Line 8, "each" should read --as each--.
Line 15, "from" should read --form--.

UNITED STATES PATENT AND TRADEMARK OFFICE
CERTIFICATE OF CORRECTION

PATENT NO. : 5,046,822
DATED : September 10, 1991
INVENTOR(S) : HIROSHI MATSUDA ET AL.     Page 5 of 6

It is certified that error appears in the above-identified patent and that said Letters Patent is hereby corrected as shown below:

COLUMN 22

Line 16, "tion" should read tion.--.
Line 27, "former" should read --the former--.
Line 28, "seconds" should read --second--.
Line 31, "of" should read --to--.
Line 41, "same after-image." should read
        --same results as in Example 17 in respect
        to contrast and after-image.--.

COLUMN 23

Line 59, "Example," should read --Examples,--.

COLUMN 24

Line 56, "at" should read --wherein at--.

COLUMN 25

Line 38, "1=an" should read --$\ell$=an--.
Line 39, "1=an" should read --$\ell$=an--.
Line 40, "1=an" should read --$\ell$=an--.
Line 41, "1+k=an" should read --$\ell$+k=an--.
Line 42, "1+k=an" should read --$\ell$+k=an--.
Line 44, "1=an" should read --$\ell$=an--.
Line 45, "1=an" should read --$\ell$=an--.
Line 60, "polyamide" should read --polyimide--.

UNITED STATES PATENT AND TRADEMARK OFFICE
CERTIFICATE OF CORRECTION

PATENT NO. : 5,046,822
DATED : September 10, 1991
INVENTOR(S) : HIROSHI MATSUDA ET AL.

It is certified that error appears in the above-identified patent and that said Letters Patent is hereby corrected as shown below:

<u>COLUMN 26</u>

Line 49, "1=an" should read --$\ell$=an--.
Line 50, "1=an" should read --$\ell$=an--.
Line 51, "mal—$C_\ell H_{2\ell}+1O$—, 1=an" should read
--mal—$C_\ell H_{2\ell+1}O$—, $\ell$=an--.
Line 52, "1+k=an" should read --$\ell$+k=an--.
Line 53, "1+k=an" should read --$\ell$+k=an--.
Line 55, "1=an" should read --$\ell$=an--.
Line 56, "1=an" should read --$\ell$=an--.

Signed and Sealed this

Sixth Day of September, 1994

Attest:

BRUCE LEHMAN

*Attesting Officer*    *Commissioner of Patents and Trademarks*